United States Patent
Zhang

(10) Patent No.: US 12,101,748 B2
(45) Date of Patent: Sep. 24, 2024

(54) METHOD AND DEVICE RELATED TO RESOURCES FOR TRANSMISSION OF BIT BLOCK IN NODES USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 331 days.

(21) Appl. No.: 17/563,057

(22) Filed: Dec. 28, 2021

(65) Prior Publication Data

US 2022/0210785 A1 Jun. 30, 2022

(30) Foreign Application Priority Data

Dec. 28, 2020 (CN) .......................... 202011577729.7

(51) Int. Cl.
 H04J 3/00 (2006.01)
 H04L 1/1829 (2023.01)
 H04W 72/0446 (2023.01)

(52) U.S. Cl.
 CPC ....... *H04W 72/0446* (2013.01); *H04L 1/1861* (2013.01)

(58) Field of Classification Search
 CPC ............. H04W 72/0446; H04W 72/40; H04W 74/0808; H04W 72/53; H04L 1/1861; H04L 1/1854; H04L 5/00
 See application file for complete search history.

(56) References Cited

U.S. PATENT DOCUMENTS

| | | | |
|---|---|---|---|
| 11,659,524 B2 * | 5/2023 | Zhang | H04W 72/04 370/329 |
| 2019/0245655 A1 | 8/2019 | Seo et al. | |
| 2021/0014893 A1 * | 1/2021 | Park | H04W 72/27 |

(Continued)

FOREIGN PATENT DOCUMENTS

| | | |
|---|---|---|
| CN | 106537836 A | 3/2017 |
| CN | 111769928 A | 10/2020 |
| KR | 20170017225 A | 2/2017 |

OTHER PUBLICATIONS

First Office Action of Chinese patent application No. CN202011577729.7 dated Feb. 28, 2024.

(Continued)

*Primary Examiner* — Abdelnabi O Musa

(57) ABSTRACT

The present disclosure discloses a method and a device in a node for wireless communications. A first receiver receives a first signaling; a first transmitter transmits a first signal in a target radio resource pool, the first signal carries a first bit block; wherein the first bit block indicates a first state or a second state; the first signaling is used to determine at least one of a first radio resource pool or a second radio resource pool; the target radio resource pool is the first radio resource pool, the second radio resource pool or one of a first-type radio resource pool; when both the first radio resource pool and the second radio resource pool do not overlap with the first-type radio resource pool in time domain and the first bit block indicates the first state, the target radio resource pool is the first radio resource pool.

20 Claims, 5 Drawing Sheets

(56) References Cited

U.S. PATENT DOCUMENTS

| | | | |
|---|---|---|---|
| 2021/0068125 A1* | 3/2021 | Lin | H04W 72/0453 |
| 2021/0227506 A1* | 7/2021 | Zhang | H04W 72/0453 |
| 2021/0258921 A1* | 8/2021 | Zhang | H04W 72/40 |
| 2022/0210785 A1* | 6/2022 | Zhang | H04L 1/1854 |
| 2022/0231802 A1* | 7/2022 | Liu | H04W 56/0045 |
| 2023/0050088 A1* | 2/2023 | Wu | H04W 24/08 |
| 2023/0232373 A1* | 7/2023 | Zhang | H04L 1/1854 370/329 |
| 2023/0412318 A1* | 12/2023 | Jiang | H04L 5/00 |
| 2023/0413235 A1* | 12/2023 | Hu | H04W 72/02 |

OTHER PUBLICATIONS

First Search Report of Chinese patent application No. CN202011577729.7 dated Feb. 26, 2024.

* cited by examiner

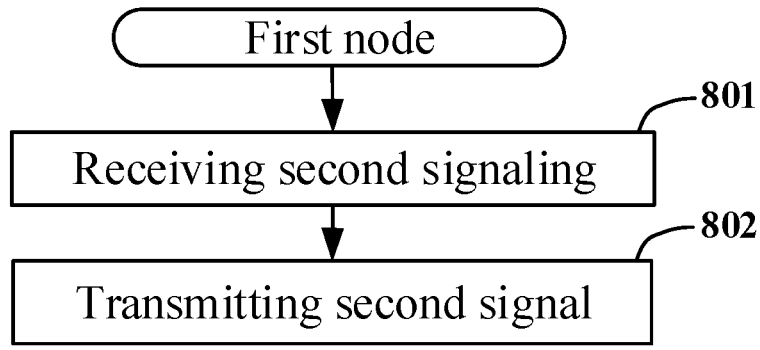
FIG. 8
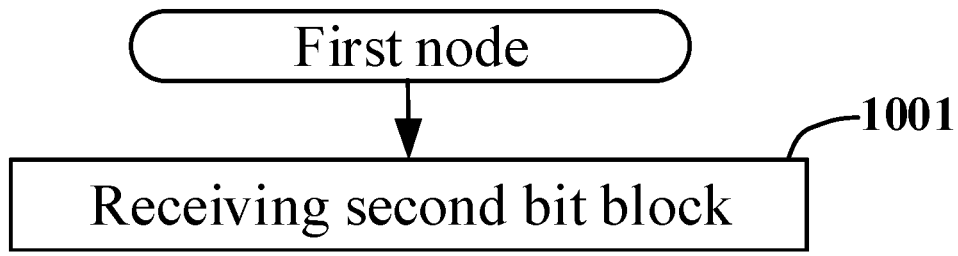
FIG. 9
FIG. 10

METHOD AND DEVICE RELATED TO RESOURCES FOR TRANSMISSION OF BIT BLOCK IN NODES USED FOR WIRELESS COMMUNICATION

CROSS REFERENCE TO RELATED APPLICATIONS

This application claims the priority benefit of Chinese Patent Application 202011577729.7, filed on Dec. 28, 2020, the full disclosure of which is incorporated herein by reference.

BACKGROUND

Technical Field

The present disclosure relates to transmission methods and devices in wireless communication systems, and in particular to a transmission method and device of a radio signal in a wireless communication system supporting cellular networks.

Related Art

In 5G NR system, in order to support communication traffic of different types and different requirements, enhancement on many aspects of HARQ-ACK (e.g., Type-3 Hybrid Automatic Repeat reQuest ACKnowledgement (HARQ-ACK) codebook, NACK only feedback mode, etc.) was studied in different Release versions of NR in 3rd Generation Partner Project (3GPP); ACK and NACK being respectively reported on different physical layer channels is also an enhancement scheme under consideration.

SUMMARY

After introducing a new HARQ-ACK feedback mode, how to deal with multiplexing of HARQ-ACK and other information (e.g., a Transport Block (TB) carrying user's data, a Channel State Information (CSI) report, etc.) is a key issue that must be solved. To address the above problem, the present disclosure provides a solution. It should be noted that though the present disclosure only took the uplink for example in the statement above, it is also applicable to other transmission scenarios of downlink and sidelink, where similar technical effects can be achieved. Additionally, the adoption of a unified solution for various scenarios (including but not limited to uplink, downlink and sidelink) contributes to the reduction of hardcore complexity and costs. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  receiving a first signaling; and
  transmitting a first signal in a target radio resource pool, the first signal carrying a first bit block;
  herein, the first bit block indicates a first state or a second state; the first signaling is used to determine at least one of a first radio resource pool or a second radio resource pool; the target radio resource pool is the first radio resource pool, the second radio resource pool or one of a first-type radio resource pool; when both the first radio resource pool and the second radio resource pool do not overlap with the first-type radio resource pool in time domain and the first bit block indicates the first state, the target radio resource pool is the first radio resource pool; when both the first radio resource pool and the second radio resource pool do not overlap with the first-type radio resource pool in time domain and the first bit block indicates the second state, the target radio resource pool is the second radio resource pool; when any of the first radio resource pool or the second radio resource pool overlaps with one of the first-type radio resource pool in time domain, the target radio resource pool is one of the first-type radio resource pool.

In one embodiment, a problem to be solved in the present disclosure includes: for transmission modes in which ACK and NACK are respectively configured to be reported on different Physical Uplink Control CHannels (PUCCHs), how to deal with the multiplexing when the PUCCHs overlap with a Physical Uplink Shared CHannel (PUSCH).

In one embodiment, a problem to be solved in the present disclosure includes: for transmission modes of different HARQ-ACK states (or SR states) being respectively configured to be reported on different PUCCHs, how to deal with the multiplexing when the PUCCHs overlap with a PUSCH (or between PUCCHs).

In one embodiment, a problem to be solved in the present disclosure includes: when a plurality of physical layer channels are respectively reserved for a plurality of reporting states indicated by the first bit block, how to address multiplexing when the plurality of physical layer channels overlap with other physical layer channels.

In one embodiment, characteristics of the above method include: the first radio resource pool is reserved to transmit the first bit block indicating the first state, and the second radio resource pool is reserved to transmit the first bit block indicating the second state; when the first bit block indicates the first state and the second radio resource pool overlaps with one of the first-type radio resource pool in time domain, even if the first radio resource pool does not overlap with the first-type radio resource pool in time domain, the first bit block indicating the first state is also transmitted in one of the first-type radio resource pool.

In one embodiment, characteristics of the above method include: the first radio resource pool is reserved to transmit the first bit block indicating the first state, and the second radio resource pool is reserved to transmit the first bit block indicating the second state; when the first bit block indicates the second state and the first radio resource pool overlaps with one of the first-type radio resource pool in time domain, even if the second radio resource pool does not overlap with the first-type radio resource pool in time domain, the first bit block indicating the second state is also transmitted in one of the first-type radio resource pool.

In one embodiment, advantages of the above method include: the inconsistency between communication parties on the understanding of the target radio resource pool is avoided.

In one embodiment, advantages of the above method include: unnecessary blind detection for the first bit block is avoided.

In one embodiment, advantages of the above method include: the risk of possible error propagation incurred by decoding errors is reduced.

In one embodiment, advantages of the above method include: uplink transmission performance is improved.

In one embodiment, advantages of the above method include: it is conducive to give full play to the advantages of multiplexing in transmission performance.

In one embodiment, advantages of the above method include: it can be compatible with more HARQ-ACK reporting modes.

According to one aspect of the present disclosure, the above method is characterized in that:

the first radio resource pool and the second radio resource pool are both reserved for the first bit block and at most one of the first radio resource pool or the second radio resource pool is used to transmit the first bit block; and the first-type radio resource pool is a radio resource pool reserved for a bit block different from the first bit block.

According to one aspect of the present disclosure, the above method is characterized in that:

the first state and the second state are both states represented by HARQ-ACK information bit(s).

According to one aspect of the present disclosure, the above method is characterized in comprising:

receiving a second signaling; and
transmitting a second signal;
herein, the second signal is transmitted in one of the first-type radio resource pool, and the second signaling is used to indicate the first-type radio resource pool transmitting the second signal.

According to one aspect of the present disclosure, the above method is characterized in that:

when the first radio resource pool does not overlap with the first-type radio resource pool in time domain and the second radio resource pool overlaps with one of the first-type radio resource pool in time domain, or the first radio resource pool overlaps with one of the first-type radio resource pool in time domain and the second radio resource pool does not overlap with the first-type radio resource pool in time domain, whether the first bit block indicates the first state or the second state, the target radio resource pool is one of the first-type radio resource pool.

In one embodiment, characteristics of the above method include: when only one of two PUCCHs reserved for two different states of the first bit block overlaps with a PUSCH in time domain (the other one of the two PUCCHs does not overlap with a PUSCH in time domain), no matter which state the first bit block indicates, the first bit block is always transmitted on a PUSCH.

According to one aspect of the present disclosure, the above method is characterized in comprising:

receiving a second bit block;
herein, the first signaling comprises scheduling information of the second bit block, and the first bit block indicates whether the second bit block is correctly received.

According to one aspect of the present disclosure, the above method is characterized in that:

the first radio resource pool and the second radio resource pool respectively belong to different cells.

In one embodiment, advantages of the above method include: scheduling flexibility of the system is increased.

In one embodiment, advantages of the above method include: it is conducive to supporting PUCCH handover.

The present disclosure provides a method in a second node for wireless communications, comprising:

transmitting a first signaling; and
receiving a first signal in a target radio resource pool, the first signal carrying a first bit block;
herein, the first bit block indicates a first state or a second state; the first signaling is used to determine at least one of a first radio resource pool or a second radio resource pool; the target radio resource pool is the first radio resource pool, the second radio resource pool or one of a first-type radio resource pool; when both the first radio resource pool and the second radio resource pool do not overlap with the first-type radio resource pool in time domain, the target radio resource pool is the first radio resource pool or the second radio resource pool; when any of the first radio resource pool or the second radio resource pool overlaps with one of the first-type radio resource pool in time domain, the target radio resource pool is one of the first-type radio resource pool.

According to one aspect of the present disclosure, the above method is characterized in that:

the first radio resource pool and the second radio resource pool are both reserved for the first bit block and at most one of the first radio resource pool or the second radio resource pool is used to transmit the first bit block; and the first-type radio resource pool is a radio resource pool reserved for a bit block different from the first bit block.

According to one aspect of the present disclosure, the above method is characterized in that:

the first state and the second state are both states represented by HARQ-ACK information bit(s).

According to one aspect of the present disclosure, the above method is characterized in comprising:

transmitting a second signaling; and
receiving a second signal;
herein, the second signal is transmitted in one of the first-type radio resource pool, and the second signaling is used to indicate the first-type radio resource pool transmitting the second signal.

According to one aspect of the present disclosure, the above method is characterized in that:

when the first radio resource pool does not overlap with the first-type radio resource pool in time domain and the second radio resource pool overlaps with one of the first-type radio resource pool in time domain, or the first radio resource pool overlaps with one of the first-type radio resource pool in time domain and the second radio resource pool does not overlap with the first-type radio resource pool in time domain, whether the first bit block indicates the first state or the second state, the target radio resource pool is one of the first-type radio resource pool.

According to one aspect of the present disclosure, the above method is characterized in comprising:

transmitting a second bit block;

herein, the first signaling comprises scheduling information of the second bit block, and the first bit block indicates whether the second bit block is correctly received.

According to one aspect of the present disclosure, the above method is characterized in that:

the first radio resource pool and the second radio resource pool respectively belong to different cells.

The present disclosure provides a first node for wireless communications, comprising:

a first receiver, receiving a first signaling;

a first transmitter, transmitting a first signal in a target radio resource pool, the first signal carrying a first bit block;

wherein the first bit block indicates a first state or a second state; the first signaling is used to determine at least one of a first radio resource pool or a second radio resource pool; the target radio resource pool is the first radio resource pool, the second radio resource pool or one of a first-type radio resource pool; when both the first radio resource pool and the second radio resource pool do not overlap with the first-type radio resource pool in time domain and the first bit block indicates the first state, the target radio resource pool is the first radio resource pool; when both the first radio resource pool and the second radio resource pool do not overlap with the first-type radio resource pool in time domain and the first bit block indicates the second state, the target radio resource pool is the second radio resource pool; when any of the first radio resource pool or the second radio resource pool overlaps with one of the first-type radio resource pool in time domain, the target radio resource pool is one of the first-type radio resource pool.

The present disclosure provides a second node for wireless communications, comprising:

a second transmitter, transmitting a first signaling; and a second receiver, receiving a first signal in a target radio resource pool, the first signal carrying a first bit block;

herein, the first bit block indicates a first state or a second state; the first signaling is used to determine at least one of a first radio resource pool or a second radio resource pool; the target radio resource pool is the first radio resource pool, the second radio resource pool or one of a first-type radio resource pool; when both the first radio resource pool and the second radio resource pool do not overlap with the first-type radio resource pool in time domain, the target radio resource pool is the first radio resource pool or the second radio resource pool; when any of the first radio resource pool or the second radio resource pool overlaps with one of the first-type radio resource pool in time domain, the target radio resource pool is one of the first-type radio resource pool.

In one embodiment, the method in the present disclosure is advantageous in the following aspects:

the inconsistency between communication parties on the understanding of the target radio resource pool is avoided;

requirements on a blind detection associated with the first bit block is reduced;

the risk of possible error propagation is reduced;

uplink transmission performance is improved;

it is conducive to be compatible with more HARQ-ACK or SR reporting modes;

scheduling flexibility of the system is increased;

it is conducive to supporting PUCCH handover.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a flowchart of a processing performed by a first node on a second signaling and a second signal according to one embodiment of the present disclosure;

FIG. 9 illustrates a schematic diagram of for a target radio resource pool according to one embodiment of the present disclosure;

FIG. 10 illustrates a flowchart of a processing performed by a first node on a second bit block according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
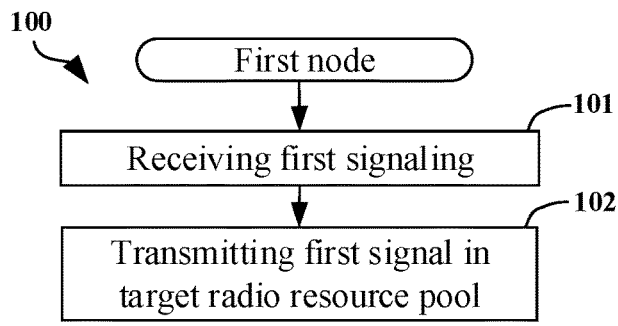
FIG. 1 illustrates a flowchart of a processing of a first node according to one embodiment of the present disclosure.

Embodiment 1 illustrates a flowchart of a processing of a first node according to one embodiment of the present disclosure, as shown in FIG. 1.

In Embodiment 1, the first node in the present disclosure receives a first signaling in step 101; and transmits a first signal in a target radio resource pool in step 102.

In embodiment 1, the first signal carries a first bit block, and the first bit block indicates a first state or a second state; the first signaling is used to determine at least one of a first radio resource pool or a second radio resource pool; the target radio resource pool is the first radio resource pool, the second radio resource pool or one of a first-type radio resource pool; when both the first radio resource pool and the second radio resource pool do not overlap with the first-type radio resource pool in time domain and the first bit block indicates the first state, the target radio resource pool is the first radio resource pool; when both the first radio resource pool and the second radio resource pool do not overlap with the first-type radio resource pool in time domain and the first bit block indicates the second state, the target radio resource pool is the second radio resource pool; when any of the first radio resource pool or the second radio resource pool overlaps with one of the first-type radio resource pool in time domain, the target radio resource pool is one of the first-type radio resource pool.

In one embodiment, the first signal comprises a radio signal.

In one embodiment, the first signal comprises a radio-frequency signal.

In one embodiment, the first signal comprises a baseband signal.

In one embodiment, the phrase of the first signal carrying a first bit block includes that the first signal comprises an output after all or partial bits in the first bit block sequentially through part or all of CRC Insertion, Segmentation, Code Block-level CRC Insertion, Channel Coding, Rate Matching, Concatenation, Scrambling, Modulation, Layer Mapping, Precoding, Mapping to Resource Element, Multicarrier symbol Generation and Modulation and Upconversion.

In one embodiment, the first bit block comprises a bit carrying control information.

In one embodiment, the first bit block is a bit block carrying Uplink Control Information (UCI).

In one embodiment, the UCI in the present disclosure comprises at least one of a HARQ-ACK, a CSI report or a Scheduling Request (SR).

In one embodiment, the first bit block comprises at least one bit.

In one embodiment, the first bit block comprises a HARQ-ACK codebook or a HARQ-ACK sub-codebook.

In one embodiment, the first bit block comprises a HARQ-ACK information bit.

In one embodiment, the first bit block comprises only one HARQ-ACK information bit.

In one embodiment, the first bit block comprises a plurality of HARQ-ACK information bits.

In one embodiment, the first bit block comprises a HARQ-ACK information bit for one or a plurality of TBs.

In one embodiment, the first bit block comprises a HARQ-ACK information bit for a Semi-Persistent Scheduling PDSCH release (SPS PDSCH release).

In one embodiment, the first bit block comprises a HARQ-ACK information bit for Multimedia Broadcast Multicast Service (MBMS).

In one embodiment, the first bit block comprises a HARQ-ACK information bit for multicast traffic.

In one embodiment, the first bit block comprises a HARQ-ACK information bit for broadcast traffic.

In one embodiment, the first bit block comprises a HARQ-ACK information bit for groupcast traffic.

In one embodiment, the first bit block comprises a HARQ-ACK information bit for unicast traffic.

In one embodiment, the first radio resource pool is a radio resource pool indicated to a single UE (i.e., the first node).

In one embodiment, the first radio resource pool is a common radio resource pool indicated to a plurality of UEs (comprising the first node).

In one embodiment, the first radio resource pool is a group-common radio resource pool.

In one embodiment, the second radio resource pool is a radio resource pool indicated to a single UE (i.e., the first node).

In one embodiment, the second radio resource pool is a common radio resource pool indicated to a plurality of UEs (comprising the first node).

In one embodiment, the second radio resource pool is a group-common radio resource pool.

In one embodiment, one of the first radio resource pool and the second radio resource pool is a radio resource pool indicated to a single UE (i.e., the first node), and the other one of the first radio resource pool and the second radio resource pool is a common radio resource pool indicated to a plurality of UEs (comprising the first node).

In one embodiment, the first signaling is dynamically configured.

In one embodiment, the first signaling comprises a layer 1 (L1) signaling.

In one embodiment, the first signaling comprises a L1 control signaling.

In one embodiment, the first signaling comprises a physical layer signaling.

In one embodiment, the first signaling comprises one or more fields in a physical layer signaling.

In one embodiment, the first signaling comprises a higher-layer signaling.

In one embodiment, the first signaling comprises one or more fields in a higher-layer signaling.

In one embodiment, the first signaling comprises a Radio Resource Control (RRC) signaling.

In one embodiment, the first signaling comprises a Medium Access Control layer Control Element (MAC CE) signaling.

In one embodiment, the first signaling comprises one or a plurality of fields in an RRC signaling.

In one embodiment, the first signaling comprises one or a plurality of fields in a MAC CE signaling.

In one embodiment, the first signaling comprises Downlink Control Information (DCI).

In one embodiment, the first signaling comprises one or more fields in a DCI.

In one embodiment, the first signaling comprises Sidelink Control Information (SCI).

In one embodiment, the first signaling comprises one or more fields in a SCI.

In one embodiment, the first signaling comprises one or more fields in an Information Element (IE).

In one embodiment, the first signaling is a DownLink Grant Signalling.

In one embodiment, the first signaling is an UpLink Grant Signalling.

In one embodiment, the first signaling is transmitted on a downlink physical layer control channel (i.e., a downlink channel only capable of carrying a physical layer signaling).

In one embodiment, the downlink physical-layer control channel in the present disclosure is a Physical Downlink Control CHannel (PDCCH).

In one embodiment, the downlink physical layer control channel in the present disclosure is a short PDCCH (sPDCCH).

In one embodiment, the downlink physical layer control channel in the present disclosure is a Narrow Band PDCCH (NB-PDCCH).

In one embodiment, the first signaling is DCI format 1_0, the specific meaning of the DCI format 1_0 can be found in 3GPP TS38.212, section 7.3.1.2.

In one embodiment, the first signaling is DCI format 1_1, the specific meaning of the DCI format 1_1 can be found in 3GPP TS38.212, section 7.3.1.2.

In one embodiment, the first signaling is DCI format 1_2, the specific meaning of the DCI format 1_2 can be found in 3GPP TS38.212, section 7.3.1.2.

In one embodiment, the first signaling is DCI format 0_0, the specific meaning of the DCI format 0_0 can be found in 3GPP TS38.212, section 7.3.1.1.

In one embodiment, the first signaling is DCI format 0_1, the specific meaning of the DCI format 0_1 can be found in 3GPP TS38.212, section 7.3.1.1.

In one embodiment, the first signaling is DCI format 0_2, the specific meaning of the DCI format 0_2 can be found in 3GPP TS38.212, section 7.3.1.1.

In one embodiment, the first signaling is a broadcast signaling.

In one embodiment, the first signaling is a multicast signaling.

In one embodiment, the first signaling is a groupcast signaling.

In one embodiment, the first signaling is a unicast signaling.

In one embodiment, the first signaling is a signaling for a single UE.

In one embodiment, the first signaling is a signaling for a plurality of UEs.

In one embodiment, the first signaling is a group-common signaling.

In one embodiment, the first state and the second state respectively represent different feedback information.

In one embodiment, the first state and the second state are respectively different SRs.

In one embodiment, the first state is a positive SR, and the second state is a negative SR.

In one embodiment, the second state is a positive SR, and the first state is a negative SR.

In one embodiment, the first state and the second state respectively correspond to different priorities.

In one embodiment, the first state and the second state are respectively different priorities.

In one embodiment, the first state and the second state respectively correspond to different QoSs.

In one embodiment, the first state and the second state are respectively different QoSs.

In one embodiment, the first state and the second state respectively correspond to feedback information on different links (e.g., uplink or sidelink, etc.).

In one embodiment, the first state and the second state respectively correspond to different transmission modes (e.g., broadcast, multicast, unicast or groupcast).

In one embodiment, the first bit block explicitly indicates the first state or the second state.

In one embodiment, the first bit block implicitly indicates the first state or the second state.

In one embodiment, the first bit block indicating the first state or the second state refers to: the first node determines the first state or the second state based on an (explicit or implicit) indication of a signaling (e.g., DCI) corresponding to the first bit block.

In one embodiment, the first bit block indicating the first state or the second state refers to: the first node determines the first state or the second state based on an (explicit or implicit) indication of one or a plurality of signalings (e.g., DCI) associated with the first bit block.

In one embodiment, the first bit block indicating the first state refers to: each of bits in the first bit block is a bit corresponding to a first priority.

In one embodiment, the first bit block indicating the second state refers to: at least one bit in the first bit block does not correspond to a bit of a first priority.

In one embodiment, the first bit block indicating the second state refers to: each of bits in the first bit block is a bit corresponding to a second priority.

In one embodiment, a priority index of the first priority is equal to 1, and a priority index of the second priority is equal to 0.

In one embodiment, the bit corresponding to the first priority includes: a TB for the first priority or a bit generated by a signaling indicating the first priority; the bit corresponding to the second priority includes: a TB for the second priority or a bit generated by a signaling indicating the second priority.

In one embodiment, the first bit block indicating the first state refers to: each of bits in the first bit block is a bit generated for uplink.

In one embodiment, the first bit block indicating the second state refers to: each of bits in the first bit block is a bit generated for sidelink.

In one embodiment, the first signaling indicates at least one of the first radio resource pool or the second radio resource pool.

In one embodiment, the first signaling explicitly indicates at least one of the first radio resource pool or the second radio resource pool.

In one embodiment, the first signaling implicitly indicates at least one of the first radio resource pool or the second radio resource pool.

In one embodiment, the first signaling indicates the first radio resource pool and the second radio resource pool.

In one embodiment, the first signaling explicitly indicates the first radio resource pool and the second radio resource pool.

In one embodiment, the first signaling implicitly indicates the first radio resource pool and the second radio resource pool.

In one embodiment, the first signaling indicates the first radio resource pool.

In one embodiment, the first signaling explicitly indicates the first radio resource pool.

In one embodiment, the first signaling implicitly indicates the first radio resource pool.

In one embodiment, the first signaling indicates the second radio resource pool.

In one embodiment, the first signaling explicitly indicates the second radio resource pool.

In one embodiment, the first signaling implicitly indicates the second radio resource pool.

In one embodiment, the first signaling indicates time-domain resources occupied by the first radio resource pool.

In one embodiment, the first signaling indicates frequency-domain resources occupied by the first radio resource pool.

In one embodiment, the first signaling indicates time-domain resources occupied by the second radio resource pool.

In one embodiment, the first signaling indicates frequency-domain resources occupied by the second radio resource pool.

In one embodiment, the first signaling indicates an index of the first radio resource pool in a radio resource pool set; the radio resource pool set comprises a plurality of radio resource pools, and the plurality of radio resource pools comprised in the radio resource pool set comprise the first radio resource pool.

In one embodiment, the first signaling indicates the first radio resource pool out of a radio resource pool set; the first radio resource pool set comprises a plurality of radio resource pools, and the plurality of radio resource pools comprised in the radio resource pool set comprise the first radio resource pool.

In one embodiment, the first signaling indicates an index of the second radio resource pool in (another) a radio resource pool set; the (another) radio resource pool set comprises a plurality of radio resource pools, and the plurality of radio resource pools comprised in the (another) radio resource pool set comprises the second radio resource pool.

In one embodiment, the first signaling indicates the second radio resource pool out of (another) a radio resource pool set; the (another) radio resource pool set comprises a plurality of radio resource pools, and the plurality of radio resource pools comprised in the (another) radio resource pool set comprises the second radio resource pool.

In one embodiment, the first signaling and a signaling other than the first signaling indicate the first radio resource pool together.

In one embodiment, the first signaling and a signaling other than the first signaling indicate the second radio resource pool together.

In one embodiment, a signaling other than the first signaling indicates the first radio resource pool.

In one embodiment, a signaling other than the first signaling indicates the second radio resource pool.

In one embodiment, a signaling other than the firsts signaling is dynamically configured.

In one embodiment, a signaling other than the first signaling comprises a layer 1 (L1) signaling.

In one embodiment, a signaling other than the first signaling comprises a layer 1 (L1) control signaling.

In one embodiment, a signaling other than the first signaling comprises a physical layer signaling.

In one embodiment, a signaling other than the first signaling comprises one or more fields in a physical layer signaling.

In one embodiment, a signaling other than the first signaling comprises a higher-layer signaling.

In one embodiment, a signaling other than the first signaling comprises one or more fields in a higher-layer signaling.

In one embodiment, a signaling other than the first signaling comprises an RRC signaling.

In one embodiment, a signaling other than the first signaling comprises a MAC CE signaling.

In one embodiment, a signaling other than the first signaling comprises one or a plurality of fields in an RRC signaling.

In one embodiment, a signaling other than the first signaling comprises one or a plurality of fields in a MAC CE signaling.

In one embodiment, a signaling other than the first signaling comprises DCI.

In one embodiment, a signaling other than the first signaling comprises one or a plurality of fields in a DCI.

In one embodiment, a signaling other than the first signaling comprises SCI.

In one embodiment, a signaling other than the first signaling comprises one or a plurality of fields in an SCI.

In one embodiment, a signaling other than the first signaling comprises one or more fields in an IE.

In one embodiment, a signaling other than the first signaling is a DownLink Grant Signalling.

In one embodiment, a signaling other than the first signaling is an UpLink Grant Signalling.

In one embodiment, a signaling other than the first signaling is transmitted on a downlink physical layer control channel (i.e., a downlink channel only capable of carrying a physical layer signaling).

In one embodiment, a signaling other than the first signaling is DCI format 1_0, and the specific meaning of the DCI format 1_0 can be found in 3GPP TS38.212, section 7.3.1.2.

In one embodiment, a signaling other than the first signaling is DCI format 1_1, and the specific meaning of the DCI format 1_1 can be found in 3GPP TS38.212, section 7.3.1.2.

In one embodiment, a signaling other than the first signaling is DCI format 1_2, and the specific meaning of the DCI format 1_2 can be found in 3GPP TS38.212, section 7.3.1.2.

In one embodiment, a signaling other than the first signaling is DCI format 0_0, and the specific meaning of the DCI format 0_0 can be found in 3GPP TS38. 212, section 7.3.1.1.

In one embodiment, a signaling other than the first signaling is DCI format 0_1, and the specific meaning of the DCI format 0_1 can be found in 3GPP TS38. 212, section 7.3.1.1.

In one embodiment, a signaling other than the first signaling is DCI format 0_2, and the specific meaning of the DCI format 0_2 can be found in 3GPP TS38. 212, section 7.3.1.1.

In one embodiment, the first radio resource pool comprises at least one Resource Element (RE) in time-frequency domain.

In one embodiment, the RE occupies a multicarrier symbol in time domain, and a subcarrier in frequency domain.

In one embodiment, the multicarrier symbol in the present disclosure is an Orthogonal Frequency Division Multiplexing (OFDM) symbol.

In one embodiment, the multicarrier symbol in the present disclosure is a Single Carrier-Frequency Division Multiple Access (SC-FDMA) symbol.

In one embodiment, the multicarrier symbol in the present disclosure is a Discrete Fourier Transform Spread OFDM (DFT-S-OFDM) symbol.

In one embodiment, the first radio resource pool comprises at least one subcarrier in frequency domain.

In one embodiment, the first radio resource pool comprises at least one Physical resource block (PRB) in frequency domain.

In one embodiment, the first radio resource pool comprises at least one Resource Block (RB) in frequency domain.

In one embodiment, the first radio resource pool comprises at least one multi-carrier symbol in time domain.

In one embodiment, the first radio resource pool comprises at least one slot in time domain.

In one embodiment, the first radio resource pool comprises at least one subslot in time domain.

In one embodiment, the first radio resource pool comprises at least one ms in time domain.

In one embodiment, the first radio resource pool comprises at least one consecutive multi-carrier symbol in time domain.

In one embodiment, the first radio resource pool comprises at least one inconsecutive slot in time domain.

In one embodiment, the first radio resource pool comprises at least one consecutive slot in time domain.

In one embodiment, the first radio resource pool comprises at least one sub-frame in time domain.

In one embodiment, the first radio resource pool is configured by a physical-layer signaling.

In one embodiment, the first radio resource pool is configured by a higher-layer signaling.

In one embodiment, the first radio resource pool is configured by an RRC signaling.

In one embodiment, the first radio resource pool is configured by a MAC CE signaling.

In one embodiment, the first radio resource pool is reserved for an uplink physical-layer channel.

In one embodiment, the first radio resource pool comprises radio resources reserved for an uplink physical layer channel.

In one embodiment, the first radio resource pool comprises radio resources occupied by an uplink physical layer channel.

In one embodiment, the first radio resource pool comprises a PUCCH resource.

In one embodiment, the first radio resource pool is reserved for a PUCCH.

In one embodiment, the first radio resource pool is reserved for a control channel.

In one embodiment, the second radio resource pool comprises at least one RE in time-frequency domain.

In one embodiment, the second radio resource pool comprises at least one subcarrier in frequency domain.

In one embodiment, the second radio resource pool comprises at least one Physical resource block (PRB) in frequency domain.

In one embodiment, the second radio resource pool comprises at least one Resource Block (RB) in frequency domain.

In one embodiment, the second radio resource pool comprises at least one multi-carrier symbol in time domain.

In one embodiment, the second radio resource pool comprises at least one slot in time domain.

In one embodiment, the second radio resource pool comprises at least one subslot in time domain.

In one embodiment, the second radio resource pool comprises at least one ms in time domain.

In one embodiment, the second radio resource pool comprises at least one consecutive multi-carrier symbol in time domain.

In one embodiment, the second radio resource pool comprises at least one inconsecutive slot in time domain.

In one embodiment, the second radio resource pool comprises at least one consecutive slot in time domain.

In one embodiment, the second radio resource pool comprises at least one sub-frame in time domain.

In one embodiment, the second radio resource pool is configured by a physical-layer signaling.

In one embodiment, the second radio resource pool is configured by a higher-layer signaling.

In one embodiment, the second radio resource pool is configured by an RRC signaling.

In one embodiment, the second radio resource pool is configured by a MAC CE signaling.

In one embodiment, the second radio resource pool is reserved for an uplink physical-layer channel.

In one embodiment, the second radio resource pool comprises radio resources reserved for an uplink physical layer channel.

In one embodiment, the second radio resource pool comprises radio resources occupied by an uplink physical layer channel.

In one embodiment, the second radio resource pool comprises a PUCCH resource.

In one embodiment, the second radio resource pool is reserved for a PUCCH.

In one embodiment, the second radio resource pool is reserved for a control channel.

In one embodiment, one of the first-type radio resource pool comprises at least one RE in time-frequency domain.

In one embodiment, one of the first-type radio resource pool comprises at least one subcarrier in frequency domain.

In one embodiment, one of the first-type radio resource pool comprises at least one PRB in frequency domain.

In one embodiment, one of the first-type radio resource pool comprises at least one RB in frequency domain.

In one embodiment, one of the first-type radio resource pool comprises at least one multi-carrier symbol in time domain.

In one embodiment, one of the first-type radio resource pool comprises at least one slot in time domain.

In one embodiment, one of the first-type radio resource pool comprises at least one subslot in time domain.

In one embodiment, one of the first-type radio resource pool comprises at least one ms in time domain.

In one embodiment, one of the first-type radio resource pool comprises at least one consecutive multi-carrier symbol in time domain.

In one embodiment, one of the first-type radio resource pool comprises at least one inconsecutive slot in time domain.

In one embodiment, one of the first-type radio resource pool comprises at least one consecutive slot in time domain.

In one embodiment, one of the first-type radio resource pool comprises at least one sub-frame in time domain.

In one embodiment, one of the first-type radio resource pool is configured by a physical-layer signaling.

In one embodiment, one of the first-type radio resource pool is configured by a higher layer signaling.

In one embodiment, one of the first-type radio resource pool is configured by an RRC signaling.

In one embodiment, one of the first-type radio resource pool is configured by a MAC CE signaling.

In one embodiment, one of the first-type radio resource pool is a radio resource pool reserved for a PUSCH.

In one embodiment, one of the first-type radio resource pool comprises radio resources occupied by a PUSCH.

In one embodiment, one of the first-type radio resource pool is radio resources occupied by a PUSCH.

In one embodiment, one of the first-type radio resource pool is a radio resource pool reserved for a shared channel.

In one embodiment, one of the first-type radio resource pool is radio resources occupied by a shared channel.

In one embodiment, the first-type radio resource pool does not comprise the first radio resource pool and the second radio resource pool.

In one embodiment, one of the first-type radio resource pool is a radio resource occupied by a PUCCH resource other than the first radio resource pool and the second radio resource pool.

In one embodiment, one of the first-type radio resource pool comprises a PUCCH resource other than a PUCCH resource comprised in the first radio resource pool and a PUCCH resource comprised in the second radio resource pool.

In one embodiment, two radio resource pools being overlapped in time domain includes: the two radio resource pools both comprises at least one same multicarrier symbol.

In one embodiment, two radio resource pools being non-overlapped in time domain includes: in time domain, one of the two radio resource pools does not comprise a multicarrier symbol comprised in the other one of the two radio resource pools, besides, the other one of the two radio resource pools also does not comprise a multicarrier symbol comprised in the one of the two radio resource pools.

In one embodiment, the first radio resource pool and the second radio resource pool are non-overlapped in time domain.

In one embodiment, the first radio resource pool and the second radio resource pool are overlapped in time domain.

In one embodiment, the first radio resource pool and the second radio resource pool are overlapped or non-overlapped in time domain.

In one embodiment, the phrase of being overlapped in time domain in the present disclosure includes being overlapped in time domain, and being overlapped in frequency domain.

In one embodiment, the phrase of being overlapped in time domain in the present disclosure includes being overlapped in time domain, and being overlapped and non-overlapped in frequency domain.

In one embodiment, the phrase of being non-overlapped in time domain in the present disclosure includes being non-overlapped in time domain, and being overlapped in frequency domain.

In one embodiment, the phrase of being non-overlapped in time domain in the present disclosure includes being non-overlapped in time domain, and being overlapped and non-overlapped in frequency domain.

In one embodiment, the first radio resource pool does not overlap with other second-type radio resource pools in time domain, and the second radio resource pool does not overlap with other second-type radio resource pools in time domain.

In one embodiment, the other second-type radio resource pools are radio resource pools comprising a PUCCH resource.

In one embodiment, the other second-type radio resource pools are radio resource pools reserved for transmitting UCIs.

In one embodiment, one of the other second-type radio resource pools is a PUCCH resource.

In one embodiment, one of the other second-type radio resource pools is a radio resource pool reserved for a PUCCH.

In one embodiment, the other second-type radio resource pools do not comprise the first radio resource pool and the second radio resource pool.

In one embodiment, the first radio resource pool and the second radio resource pool are second-type radio resource pools.

In one embodiment, the second-type radio resource pool is a radio resource pool comprising a PUCCH resource.

In one embodiment, the second-type radio resource pool is a radio resource pool reserved for a PUCCH.

In one embodiment, the second-type radio resource pool is radio resources occupied by a PUCCH.

In one embodiment, the second-type radio resource pool is a radio resource pool reserved for a control channel.

In one embodiment, the second-type radio resource pool is radio resources occupied by a control channel.

In one embodiment, the other second-type radio resource pools comprise the second-type radio resource pool other than the first radio resource pool and the second radio resource pool.

In one embodiment, the second-type radio resource pool comprises at least one RE in time-frequency domain.

In one embodiment, the second-type radio resource pool comprises at least one subcarrier in frequency domain.

In one embodiment, the second-type radio resource pool comprises at least one PRB in frequency domain.

In one embodiment, the second-type radio resource pool comprises at least one RB in frequency domain.

In one embodiment, the second-type radio resource pool comprises at least one multi-carrier symbol in time domain.

In one embodiment, the second-type radio resource pool comprises at least one slot in time domain.

In one embodiment, the second-type radio resource pool comprises at least one subslot in time domain.

In one embodiment, the second-type radio resource pool comprises at least one ms in time domain.

In one embodiment, the second-type radio resource pool comprises at least one consecutive multi-carrier symbol in time domain.

In one embodiment, the second-type radio resource pool comprises at least one inconsecutive slot in time domain.

In one embodiment, the second-type radio resource pool comprises at least one consecutive slot in time domain.

In one embodiment, the second-type radio resource pool comprises at least one sub-frame in time domain.

In one embodiment, the second-type radio resource pool is configured by a physical-layer signaling.

In one embodiment, the second-type radio resource pool is configured by a higher-layer signaling.

In one embodiment, the second-type radio resource pool is configured by an RRC signaling.

In one embodiment, the second-type radio resource pool is configured by a MAC CE signaling.

In one embodiment, the first radio resource pool and the first-type radio resource pool are non-overlapped in time domain; the second radio resource pool is overlapped with the first-type radio resource pool in time domain, or, the second radio resource pool is non-overlapped with one of the first-type radio resource pool in time domain; when both the second radio resource pool and the first-type radio resource pool do not overlap with the first-type radio resource pool in time domain and the first bit block indicates the first state, the target radio resource pool is the first radio resource pool; when both the second radio resource pool and the first-type radio resource pool do not overlap with the first-type radio resource pool in time domain and the first bit block indicates the second state, the target radio resource pool is the second radio resource pool; and when the second radio resource pool overlapped with one of the first-type radio resource pool in time domain, the target radio resource pool is the one of the first-type radio resource pool.

In one embodiment, the second radio resource pool and the first-type radio resource pool are non-overlapped in time domain; the first radio resource pool is overlapped with one of the first-type radio resource pool in time domain, or, the first radio resource pool is non-overlapped with the first-type radio resource pool in time domain; when both the first radio resource pool and the first-type radio resource pool do not overlap with the first-type radio resource pool in time domain and the first bit block indicates the first state, the target radio resource pool is the first radio resource pool; when both the first radio resource pool and the first-type radio resource pool do not overlap with the first-type radio resource pool in time domain and the first bit block indicates the second state, the target radio resource pool is the second radio resource pool; and when the first radio resource pool overlapped with one of the first-type radio resource pool in time domain, the target radio resource pool is the one of the first-type radio resource pool.

In one embodiment, the meaning of the first radio resource block and the first-type radio resource block being non-overlapped in time domain includes: the first radio resource pool and any the first-type radio resource pool are non-overlapped in time domain.

In one embodiment, the meaning of the second radio resource block and the first-type radio resource block being non-overlapped in time domain includes: the first radio resource pool and any the first-type radio resource pool are non-overlapped in time domain.

In one embodiment, the target radio resource pool is related to whether at least one of the first radio resource pool or the second radio resource pool overlaps with one of the first-type radio resource pool in time domain.

In one embodiment, when both the first radio resource pool and the second radio resource pool do not overlap with the first-type radio resource pool in time domain, the target radio resource pool is related to a state indicated by the first bit block.

In one embodiment, the target radio resource pool is related to at least a former of whether at least one of the first radio resource pool or the second radio resource pool overlaps with one of the first-type radio resource pool in time domain and a state indicated by the first bit block.

In one embodiment, whether at least one of the first radio resource pool or the second radio resource pool overlaps with one of the first-type radio resource pool in time domain is used to determine the target radio resource pool.

In one embodiment, when both the first radio resource pool and the second radio resource pool do not overlap with the first-type radio resource pool in time domain, a state indicated by the first bit block is used to determine the target radio resource pool.

In one embodiment, at least a former of whether at least one of the first radio resource pool or the second radio resource pool overlaps with one of the first-type radio resource pool in time domain and a state indicated by the first bit block is used to determine the target radio resource pool.

In one embodiment, when any of the first radio resource pool or the second radio resource pool overlaps with one of the first-type radio resource pool in time domain, the target radio resource pool is one of the first-type radio resource pool being overlapped with at least one of the first radio resource pool or the second radio resource pool in time domain.

In one embodiment, the phrase of the target radio resource pool being the first radio resource pool, the second radio resource pool or one of a first-type radio resource pool includes: the target radio resource pool is one of three of the first radio resource pool, the second radio resource pool or one of the first-type radio resource pool.

In one embodiment, the first radio resource pool and the second radio resource pool are both reserved for the first bit block and at most one of the first radio resource pool or the second radio resource pool is used to transmit the first bit block.

In one embodiment, the first-type radio resource pool is reserved for a transmission of a bit block other than the first bit block.

In one embodiment, the first-type radio resource pool is a radio resource pool reserved for a bit block different from the first bit block.

In one embodiment, a bit block other than the first bit block, or a bit block other than the first bit block includes: at least one bit.

In one embodiment, a bit block other than the first bit block, or a bit block other than the first bit block includes: at least one of UCI or UL-SCH information bit.

In one embodiment, the second radio resource pool the first-type radio resource pool are non-overlapped in time domain, or, the second radio resource pool and one of the first-type radio resource pool are overlapped in time domain.

In one embodiment, the first radio resource pool and the first-type radio resource pool are non-overlapped in time domain, or, the first radio resource pool and one of the first-type radio resource pool are overlapped in time domain.

In one embodiment, the second radio resource pool and the first-type radio resource pool are non-overlapped in time domain, or, the second radio resource pool and one or a plurality of the first-type radio resource pool are overlapped in time domain.

In one embodiment, the first radio resource pool and the first-type radio resource pool are non-overlapped in time domain, or, the first radio resource pool and one or a plurality of the first-type radio resource pool are overlapped in time domain.

Embodiment 2

Figure 2:
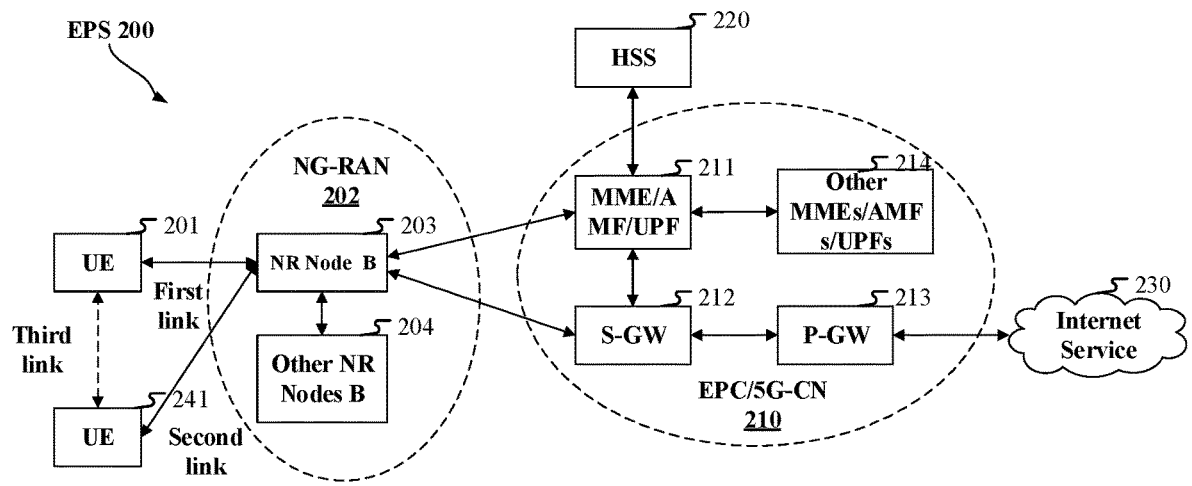
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, the gNB 203 corresponds to the first node in the present disclosure.

In one embodiment, the gNB 203 corresponds to the second node in the present disclosure.

In one embodiment, the UE 241 corresponds to the first node in the present disclosure.

In one embodiment, the UE 201 corresponds to the second node in the present disclosure.

Embodiment 3

Figure 3:
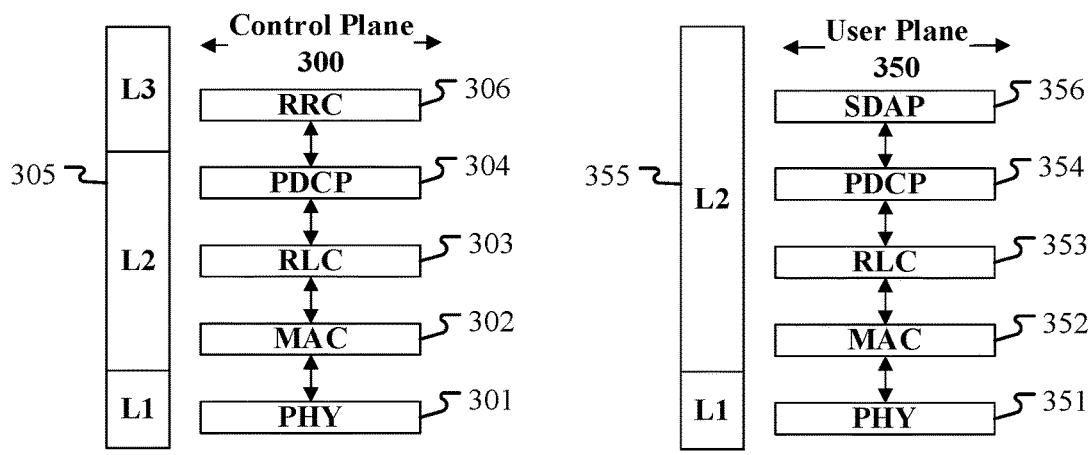
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or RSU in V2X) and a second communication node (gNB, UE or RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The RRC sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, e.g., a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the RRC sublayer 306.

In one embodiment, the first signaling in the present disclosure is generated by the MAC sublayer 302.

In one embodiment, the first signaling in the present disclosure is generated by the MAC sublayer 352.

In one embodiment, the first signaling in the present disclosure is generated by the PHY 301.

In one embodiment, the first signaling in the present disclosure is generated by the PHY 351.

In one embodiment, the second signaling in the present disclosure is generated by the RRC sublayer 306.

In one embodiment, the second signaling in the present disclosure is generated by the MAC sublayer 302.

In one embodiment, the second signaling in the present disclosure is generated by the MAC sublayer 352.

In one embodiment, the second signaling in the present disclosure is generated by the PHY 301.

In one embodiment, the second signaling in the present disclosure is generated by the PHY 351.

In one embodiment, the first bit block in the present disclosure is generated by the RRC sublayer 306.

In one embodiment, the first bit block in the present disclosure is generated by the SDAP sublayer 356.

In one embodiment, the first bit block in the present disclosure is generated by the MAC sublayer 302.

In one embodiment, the first bit block in the present disclosure is generated by the MAC sublayer 352.

In one embodiment, the first bit block in the present disclosure is generated by the PHY 301.

In one embodiment, the first bit block in the present disclosure is generated by the PHY 351.

In one embodiment, the second bit block in the present disclosure is generated by the RRC sublayer 306.

In one embodiment, the second bit block in the present disclosure is generated by the SDAP sublayer 356.

In one embodiment, the second bit block in the present disclosure is generated by the MAC sublayer 302.

In one embodiment, the second bit block in the present disclosure is generated by the MAC sublayer 352.

In one embodiment, the second bit block in the present disclosure is generated by the PHY 301.

In one embodiment, the second bit block in the present disclosure is generated by the PHY 351.

Embodiment 4

Figure 4:
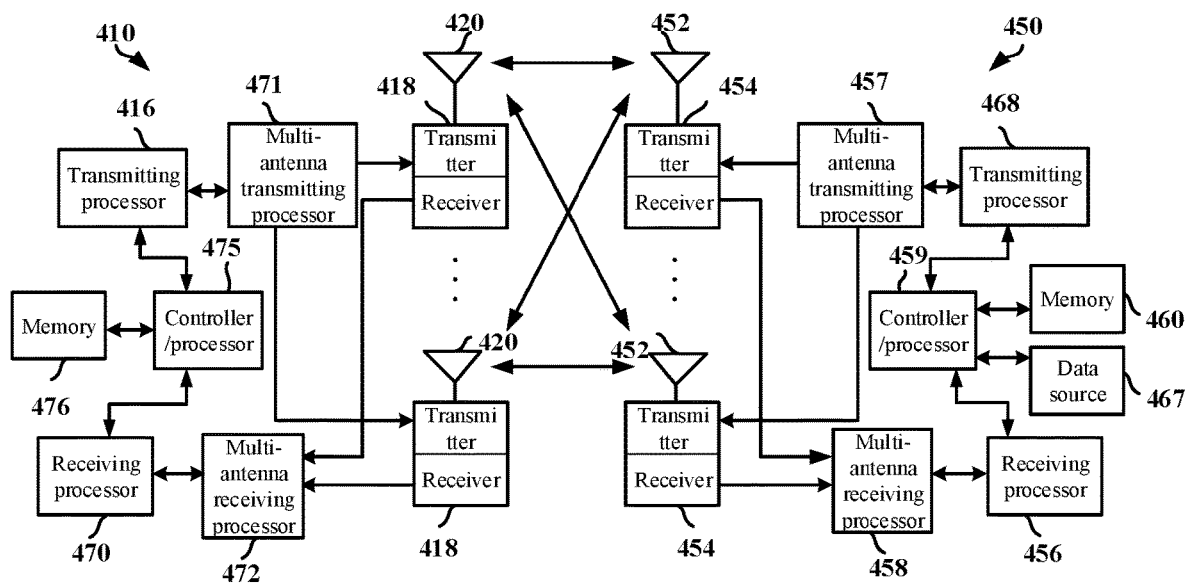
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second node is a UE, and the first node is a base station.

In one subembodiment of the above embodiment, the second node is a relay node, and the first node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling in the present disclosure; and transmits the first signal in the present disclosure in the target radio resource pool in the present disclosure, and the first signal carries the first bit block in the present disclosure; herein, the first bit block indicates the first state in the present disclosure or the second state in the present disclosure; the first signaling is used to determine at least one of the first radio resource pool in the present disclosure or the second radio resource pool in the present disclosure; the target radio resource pool is the first radio resource pool, the second radio resource pool or one of the first-type radio resource pool in the present disclosure; when both the first radio resource pool and the second radio resource pool do not overlap with the first-type radio resource pool in time domain and the first bit block indicates the first state, the target radio resource pool is the first radio resource pool; when both the first radio resource pool and the second radio resource pool do not overlap with the first-type radio resource pool in time domain and the first bit block indicates the second state, the target radio resource pool is the second radio resource pool; when any of the first radio resource pool or the second radio resource pool overlaps with one of the first-type radio resource pool in time domain, the target radio resource pool is one of the first-type radio resource pool.

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes: receiving the first signaling in the present disclosure; and transmitting the first signal in the present disclosure in the target radio resource pool in the present disclosure, and the first signal carrying the first bit block in the present disclosure; herein, the first bit block indicates the first state in the present disclosure or the second state in the present disclosure; the first signaling is used to determine at least one of the first radio resource pool in the present disclosure or the second radio resource pool in the present disclosure; the target radio resource pool is the first radio resource pool, the second radio resource pool or one of the first-type radio resource pool in the present disclosure; when both the first radio resource pool and the second radio resource pool do not overlap with the first-type radio resource pool in time domain and the first bit block indicates the first state, the target radio resource pool is the first radio resource pool; when both the first radio resource pool and the second radio resource pool do not overlap with the first-type radio resource pool in time domain and the first bit block indicates the second state, the target radio resource pool is the second radio resource pool; when any of the first radio resource pool or the second radio resource pool overlaps with one of the first-type radio resource pool in time domain, the target radio resource pool is one of the first-type radio resource pool.

In one subembodiment of the above embodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signaling in the present disclosure; and receives the first signal in the present disclosure in the target radio resource pool in the present disclosure, and the first signal carries the first bit block in the present disclosure; herein, the first bit block indicates the first state in the present disclosure or the second state in the present disclosure; the first signaling is used to determine at least one of the first radio resource pool in the present disclosure or the second radio resource pool in the present disclosure; the target radio resource pool is the first radio resource pool, the second radio resource pool or one of the first-type radio resource pool in the present disclosure; when both the first radio resource pool and the second radio resource pool do not overlap with the first-type radio resource pool in time domain, the target radio resource pool is the first radio resource pool or the second radio resource pool; when any of the first radio resource pool or the second radio resource pool overlaps with one of the first-type radio resource pool in time domain, the target radio resource pool is one of the first-type radio resource pool.

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes: transmitting the first signaling in the present disclosure; and receiving the first signal in the present disclosure in the target radio resource pool in the present disclosure, and the first signal carrying the first bit block in the present disclosure; herein, the first bit block indicates a first state in the present disclosure or a second state in the present disclosure; the first signaling is used to determine at least one of the first radio resource pool in the present disclosure or the second radio resource pool in the present disclosure; the target radio resource pool is the first radio resource pool, the second radio resource pool or one of the first-type radio resource pool in the present disclosure; when both the first radio resource pool and the second radio resource pool do not overlap with the first-type radio resource pool in time domain, the target radio resource pool is the first radio resource pool or the second radio resource pool; when any of the first radio resource pool or the second radio resource pool overlaps with one of the first-type radio resource pool in time domain, the target radio resource pool is one of the first-type radio resource pool.

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the first signaling in the present disclosure.

In one embodiment, at least one of the antenna 420, the transmitter 418, the multi-antenna transmitting processor 471, the transmitting processor 416, the controller/processor 475, or the memory 476 is used to transmit the first signaling in the present disclosure.

In one embodiment, at least one of the antenna 452, the transmitter 454, the multi-antenna transmission processor 458, the transmitting processor 468, the controller/processor 459, the memory 460, or the data source 467 is used to transmit the first signal in the present disclosure in the target radio resource pool in the present disclosure.

In one embodiment, at least one of the antenna 420, the receiver 418, the multi-antenna receiving processor 472, the receiving processor 470, the controller/processor 475, or the memory 476 is used to receive the first signal in the present disclosure in the target radio resource pool in the present disclosure.

In one embodiment, at least one of the antenna 452, the receiver 454, the multi-antenna receiving processor 458, the receiving processor 456, the controller/processor 459, the memory 460, or the data source 467 is used to receive the second signaling in the present disclosure.

In one embodiment, at least one of the antenna 420, the transmitter 418, the multi-antenna transmitting processor 471, the transmitting processor 416, the controller/processor 475, or the memory 476 is used to transmit the second signaling in the present disclosure.

In one embodiment, at least one of the antenna 452, the transmitter 454, the multi-antenna transmitting processor 458, the transmitting processor 468, the controller/processor 459, the memory 460, or the data sources 467 is used to transmit the second signal in the present disclosure.

In one embodiment, at least one of the antenna 420, the receiver 418, the multi-antenna receiving processor 472, the receiving processor 470, the controller/processor 475, or the memory 476 is used to receive the second signal in the present disclosure.

In one embodiment, at least one of the antenna 452, the receiver 454, the multi-antenna receiving processor 458, the receiving processor 456, the controller/processor 459, the memory 460, or the data source 467 is used to receive the second bit block in the present disclosure.

In one embodiment, at least one of the antenna 420, the transmitter 418, the multi-antenna transmitting processor 471, the transmitting processor 416, the controller/processor 475, or the memory 476 is used to transmit the second bit block in the present disclosure.

Embodiment 5

Figure 5:
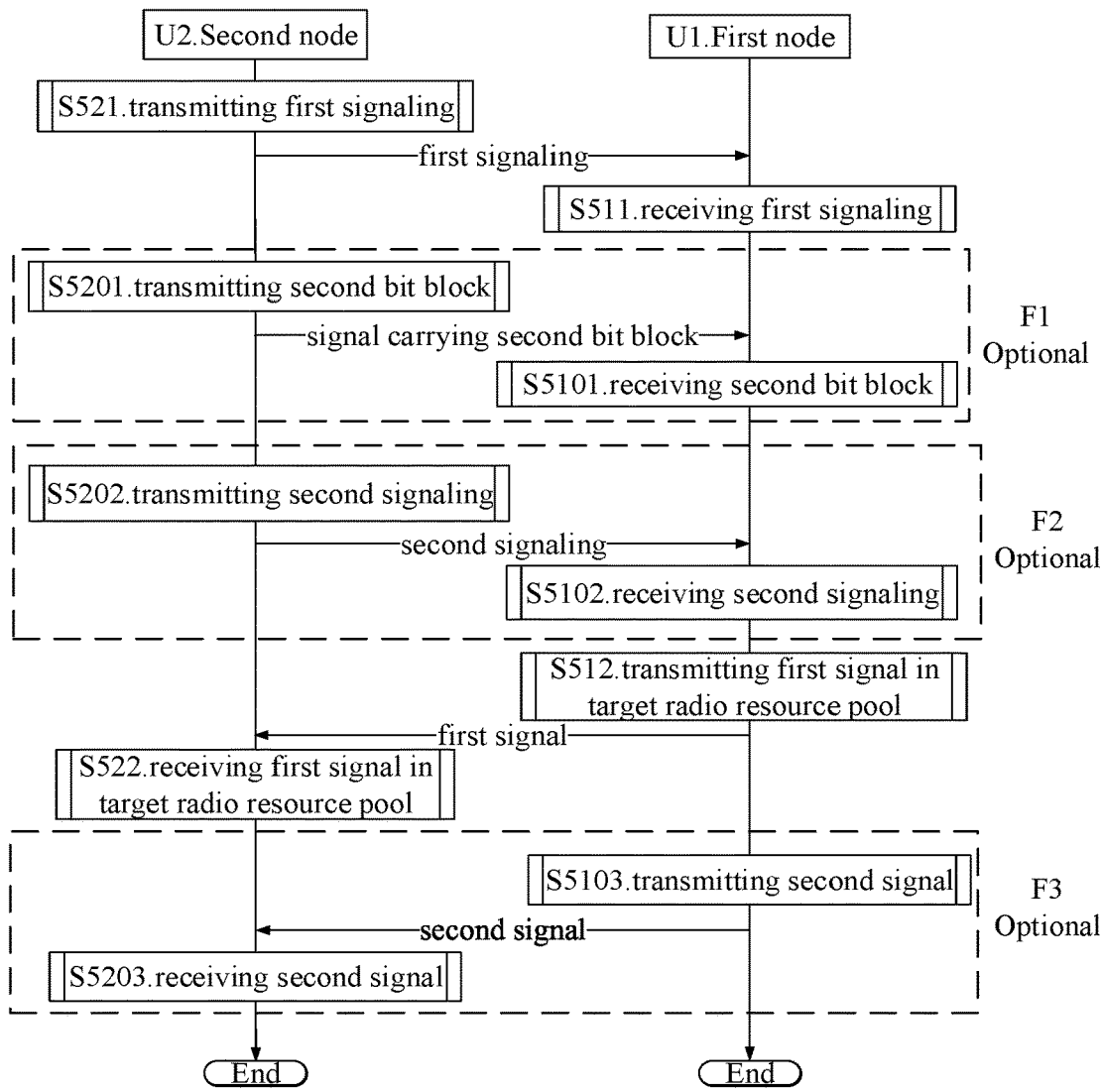
FIG. 5 illustrates a flowchart of signal transmission according to one embodiment of the present disclosure.

Embodiment 5 illustrates a flowchart of radio signal transmission according to one embodiment in the present disclosure, as shown in FIG. 5. In FIG. 5, a first node U1 and a second node U2 are in communications via an air interface. In FIG. 5, steps in dotted box F1, F2 and F3 are optional. In particular, positions of steps in the dotted boxes F1, F2 and F3 in FIG. 5 do not represent a specific chronological order.

The first node U1 receives a first signaling in step S511; receives a second bit block in step S5101; receives a second signaling in step S5102; transmits a first signal in a target radio resource pool in step S512; and transmits a second signal in step S5103.

The second node U2 transmits a first signaling in step S521; transmits a second bit block in step S5201; transmits a second signaling in step S5202; receives a first signal in a target radio resource pool in step S522; and receives a second signal in step S5203.

In embodiment 5, the first signal carries a first bit block; the first bit block indicates a first state or a second state; the first signaling is used to determine at least one of a first radio resource pool or a second radio resource pool; the target radio resource pool is the first radio resource pool, the second radio resource pool or one of a first-type radio resource pool; when both the first radio resource pool and the second radio resource pool do not overlap with the first-type radio resource pool in time domain and the first bit block indicates the first state, the target radio resource pool is the first radio resource pool; when both the first radio resource pool and the second radio resource pool do not overlap with the first-type radio resource pool in time domain and the first bit block indicates the second state, the target radio resource pool is the second radio resource pool; when any of the first radio resource pool or the second radio resource pool overlaps with one of the first-type radio resource pool in time domain, the target radio resource pool is one of the first-type radio resource pool; the first radio resource pool and the second radio resource pool are both reserved for the first bit block and at most one of the first radio resource pool or the second radio resource pool is used to transmit the first bit block; and the first-type radio resource pool is a radio resource pool reserved for a bit block different from the first bit block; the first state and the second state are both states represented by a HARQ-ACK information bit; the second signal is transmitted in one of the first-type radio resource pool, and the second signaling is used to indicate the first-type radio resource pool transmitting the second signal; when the first radio resource pool does not overlap with the first-type radio resource pool in time domain and the second radio resource pool overlaps with one of the first-type radio resource pool in time domain, or the first radio resource pool overlaps with one of the first-type radio resource pool in time domain and the second radio resource pool does not overlap with the first-type radio resource pool in time domain, whether the first bit block indicates the first state or the second state, the target radio resource pool is one of the first-type radio resource pool; the first signaling comprises scheduling information of the second bit block, and the first bit block indicates whether the second bit block is correctly received.

In one subembodiment of embodiment 5, the first radio resource pool and the second radio resource pool respectively belong to different cells.

In one embodiment, the first node U2 is the first node in the present disclosure.

In one embodiment, the second node U2 is the second node in the present disclosure.

In one embodiment, the first node U1 is a UE.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 comprises a cellular link.

In one embodiment, an air interface between the second node U2 and the first node U1 is a PC5 interface.

In one embodiment, an air interface between the second node U2 and the first node U1 comprises a sidelink.

In one embodiment, an air interface between the second node U2 and the first node U1 comprises a radio interface between a base station and a UE.

In one embodiment, an air interface between the second node U2 and the first node U1 comprises a radio interface between UEs.

In one embodiment, in the present disclosure, when two radio resource pools are overlapped in time domain, all required timeline conditions are satisfied.

In one embodiment, in the present disclosure, when the first radio resource pool or the second radio resource pool is overlapped with one of the first-type radio resource pool in time domain, all timeline conditions required to be satisfied are satisfied.

In one embodiment, the timeline conditions comprise timeline conditions required to be satisfied for executing multiplexing.

In one embodiment, the timeline conditions comprise one or a plurality of timeline conditions described in 3GPP TS38.213, section 9.2.5.

In one embodiment, the first radio resource pool and the second radio resource pool respectively belong to different serving cells.

In one embodiment, frequency-domain resources occupied by the first radio resource pool and frequency-domain resources occupied by the second radio resource pool respectively belong to different serving cells.

In one embodiment, in time domain: partial or all time-domain resources occupied by the second radio resource pool belong to downlink transmission resources under a configuration for a serving cell to which the first radio resource pool belongs, or, partial or all time-domain resources occupied by the first radio resource pool belong to downlink transmission resources under a configuration for a serving cell to which the second radio resource pool belongs.

In one embodiment, advantages of the above method include: a plurality of UEs can share a radio resource pool on a serving cell to transmit a NACK (or ACK), which is conducive to flexible scheduling resources.

In one embodiment, one of frequency-domain resources occupied by the first radio resource pool and frequency-domain resources occupied by the second radio resource pool belong to frequency-domain resources on Supplementary uplink (SUL), and the other one of frequency-domain resources occupied by the first radio resource pool and frequency-domain resources occupied by the second radio resource pool belong to frequency-domain resources on non-SUL.

In one embodiment, a priority of the first bit block is related to a state indicated by the first bit block.

In one embodiment, when the first bit block indicates the first state, a priority of the first bit block is a first priority; and when the first bit block indicates the second state, a priority of the first bit block is a second priority.

In one embodiment, the first priority is higher than the second priority.

In one embodiment, a priority index of the first priority is equal to 1, and a priority index of the second priority is equal to 0.

In one embodiment, the first priority and the second priority respectively correspond to different Quality of Services (QoSs).

In one embodiment, the meaning of the phrase of receiving a first signal in a target radio resource pool includes: the first bit block is correctly received in the target radio resource pool.

In one embodiment, the meaning of the phrase of receiving a first signal in a target radio resource pool includes: the first bit block is correctly detected in the target radio resource pool.

In one embodiment, the second node monitors a signal in at least one of the first radio resource pool, the second radio resource pool or one of a first-type radio resource pool.

In one embodiment, when both the first radio resource pool and the second radio resource pool do not overlap with the first-type radio resource pool in time domain, the second node monitors a signal in at least one of the first radio resource pool or the second radio resource pool.

In one embodiment, when both the first radio resource pool and the second radio resource pool do not overlap with the first-type radio resource pool in time domain, the second node monitors a signal in the first radio resource pool and the second radio resource pool.

In one embodiment, when both the first radio resource pool and the second radio resource pool do not overlap with the first-type radio resource pool in time domain, the second node attempts to receive the first signal in at least one of the first radio resource pool or the second radio resource pool.

In one embodiment, when both the first radio resource pool and the second radio resource pool do not overlap with the first-type radio resource pool in time domain, the second node attempts to receive the first signal in both the first radio resource pool and the second radio resource pool.

In one embodiment, when any of the first radio resource pool or the second radio resource pool overlaps with one of the first-type radio resource pool in time domain, the second node monitors the first signal in one of the first-type radio resource pool.

In one embodiment, when both the first radio resource pool and the second radio resource pool do not overlap with the first-type radio resource pool in time domain and the first bit block indicates the first state, the target radio resource pool is the first radio resource pool.

In one embodiment, when both the first radio resource pool and the second radio resource pool do not overlap with the first-type radio resource pool in time domain and the first bit block indicates the second state, the target radio resource pool is the second radio resource pool.

In one embodiment, when the target radio resource pool is used to transmit the first-type radio resource pool of the second signal, the first signal and the second signal are both transmitted on a PUSCH in the target radio resource pool.

In one embodiment, in chronological order, steps in the dotted box F1 are taken before steps in the dotted box F2.

In one embodiment, in chronological order, steps in the dotted box F1 are taken after steps in the dotted box F2.

In one embodiment, in chronological order, steps in dotted box F3 and steps S512 and S522 are in no particular order.

In one embodiment, in chronological order, steps in dotted box F2 are taken before or after steps S511 and S521.

In one embodiment, in chronological order, steps in dotted box F2 are taken before or after steps S512 and S522.

In one embodiment, in chronological order, steps in dotted box F3 are taken before or after steps S512 and S531.

In one embodiment, steps in dotted box F1 in FIG. 5 exist.

In one embodiment, steps in dotted box F1 in FIG. 5 do not exist.

In one embodiment, steps in dotted box F2 in FIG. 5 exist.

In one embodiment, steps in dotted box F2 in FIG. 5 do not exist.

In one embodiment, steps in dotted box F3 in FIG. 5 exist.

In one embodiment, steps in dotted box F3 in FIG. 5 do not exist.

Embodiment 6

Figure 6:
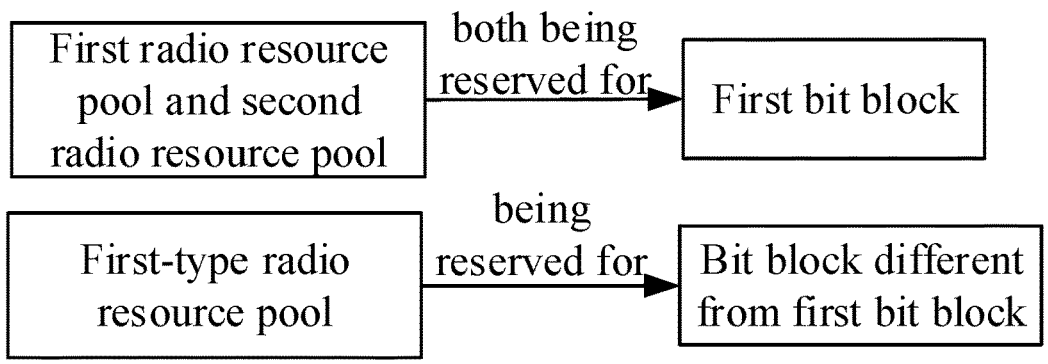
FIG. 6 illustrates a schematic diagram of relations among a first radio resource pool, a second radio resource pool, a first-type radio resource pool and a first bit block according to one embodiment of the present disclosure.

Embodiment 6 illustrates a schematic diagram of relations among a first radio resource pool, a second radio resource pool, a first-type radio resource pool and a first bit block according to one embodiment of the present disclosure, as shown in FIG. 6.

In embodiment 6, a first radio resource pool and a second radio resource pool are both reserved for a first bit block and at most one of the first radio resource pool or the second radio resource pool is used to transmit the first bit block; and a first-type radio resource pool is reserved for a bit block other than the first bit block.

In one embodiment, the first bit block comprises a HARQ-ACK information bit, and the bit block different from the first bit block does not comprise a HARQ-ACK information bit.

In one embodiment, the first bit block comprises an SR bit, and the bit block different from the first bit block does not comprise an SR bit.

In one embodiment, the bit block different from the first bit block comprises a Transport Block (TB) or a (semi-persistent or aperiodic) CSI report.

In one embodiment, the first bit block is a bit block associated with a downlink grant signaling, and the bit block different from the first bit block is a bit block scheduled by an uplink grant signaling.

In one embodiment, the first radio resource pool and the second radio resource pool are respectively reserved for transmission of the first bit block in different states.

In one embodiment, the first radio resource pool is reserved for a transmission of the first bit block indicating the first state, and the second radio resource pool is reserved for a transmission of the first bit block indicating the second state.

In one embodiment, the first radio resource pool and the second radio resource pool are both radio resource pools reserved for a transmission of a HARQ-ACK.

In one embodiment, the first radio resource pool and the second radio resource pool are both radio resource pools reserved for a transmission of an SR.

In one embodiment, the first radio resource pool comprises a PUCCH resource only used for feeding NACK back.

In one embodiment, the second radio resource pool comprises a PUCCH resource only used for feeding a ACK back.

In one embodiment, the first radio resource pool comprises a PUCCH resource only used for feeding a NACK back.

In one embodiment, the second radio resource pool comprises a PUCCH resource only used for feeding a ACK back.

In one embodiment, the first radio resource pool is reserved for a transmission of a ACK, and the second radio resource pool is reserved for a transmission of a NACK.

In one embodiment, the second radio resource pool is reserved for a transmission of a ACK, and the first radio resource pool is reserved for a transmission of a NACK.

In one embodiment, the first radio resource pool is reserved for a transmission of a positive SR, and the second radio resource pool is reserved for a transmission of a negative SR.

In one embodiment, the second radio resource pool is reserved for a transmission of a positive SR, and the first radio resource pool is reserved for a transmission of a negative SR.

In one embodiment, one of the first-type radio resource pool is reserved for at least one TB.

In one embodiment, one of the first-type radio resource pool is reserved for a transmission of a UL-SCH information bit.

In one embodiment, one of the first-type radio resource pool is reserved for a transmission of a CSI report.

In one embodiment, one of the first-type radio resource pool is reserved for a semi-persistent or an aperiodic CSI report.

In one embodiment, one of the first-type radio resource pool is reserved for at least one TB, or, one of the first-type radio resource pool is reserved for a semi-persistent CSI report or an aperiodic CSI report.

Embodiment 7

Figure 7:
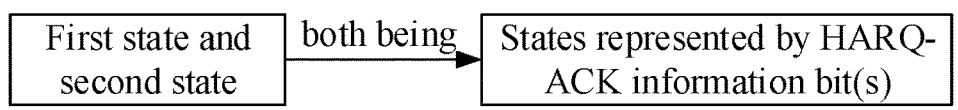
FIG. 7 illustrates a schematic diagram of a first state and a second state according to one embodiment of the present disclosure.

Embodiment 7 illustrates a schematic diagram of a first state and a second state according to one embodiment of the present disclosure, as shown in FIG. 7.

In embodiment 7, both a first state and a second state are states represented by a HARQ-ACK information bit.

In one embodiment, the first state is different from the second state.

In one embodiment, the first state and the second state are both states consist of at least one ACK or NACK.

In one embodiment, the first state is a ACK, and the second state is a NACK.

In one embodiment, the first state is a NACK, and the second state is a ACK.

In one embodiment, the first bit block indicating the first state refers to: all bits in the first bit block indicate a ACK; the first bit block indicating the second state refers to: at least one bit in the first bit block indicates a NACK.

In one embodiment, the first bit block indicating the first state refers to: all bits in the first bit block indicate a NACK; the first bit block indicating the second state refers to: at least one bit in the first bit block indicates a ACK.

In one embodiment, the first bit block indicating the second state refers to: all bits in the first bit block indicate a ACK; the first bit block indicating the first state refers to: at least one bit in the first bit block indicates a NACK.

In one embodiment, the first bit block indicating the second state refers to: all bits in the first bit block indicate a NACK; the first bit block indicating the first state refers to: at least one bit in the first bit block indicates a ACK.

Embodiment 8

Embodiment 8 illustrates a flowchart of a processing performed by a first node on a second signaling and a second signal according to one embodiment of the present disclosure, as shown in FIG. 8.

In Embodiment 8, the first node in the present disclosure receives a second signaling in step 801; and transmits a second signal in step 802.

In embodiment 8, the second signal is transmitted in one of the first-type radio resource pool in the present disclosure, and the second signaling is used to indicate the first-type radio resource pool transmitting the second signal.

In one embodiment, the second signaling is dynamically configured.

In one embodiment, the second signaling comprises a L1 signaling.

In one embodiment, the second signaling comprises a L1 control signaling.

In one embodiment, the second signaling comprises a physical layer signaling.

In one embodiment, the second signaling comprises one or more fields in a physical layer signaling.

In one embodiment, the second signaling comprises a higher-layer signaling.

In one embodiment, the second signaling comprises one or more fields in a higher-layer signaling.

In one embodiment, the second signaling comprises an RRC signaling.

In one embodiment, the second signaling comprises a MAC CE signaling.

In one embodiment, the second signaling comprises one or more fields in an RRC signaling.

In one embodiment, the second signaling comprises one or a plurality of fields in a MAC CE signaling.

In one embodiment, the second signaling comprises DCI.

In one embodiment, the second signaling comprises one or more fields of DCI.

In one embodiment, the second signaling comprises SCI.

In one embodiment, the second signaling comprises one or more fields of SCI.

In one embodiment, the second signaling comprises one or more Fields in an IE.

In one embodiment, the second signaling is a DownLink Grant Signalling.

In one embodiment, the second signaling is an UpLink Grant Signaling.

In one embodiment, the second signaling is transmitted on a downlink physical layer control channel (i.e., a downlink channel that can only be used for bearing physical layer signaling).

In one embodiment, the second signaling is DCI format 1_0, the specific meaning of the DCI format 1_0 can be found in 3GPP TS38.212, section 7.3.1.2.

In one embodiment, the second signaling is DCI format 1_1, the specific meaning of the DCI format 1_1 can be found in 3GPP TS38.212, section 7.3.1.2.

In one embodiment, the second signaling is DCI format 1_2, the specific meaning of the DCI format 1_2 can be found in 3GPP TS38.212, section 7.3.1.2.

In one embodiment, the second signaling is DCI format 0_0, the specific meaning of the DCI format 0_0 can be found in 3GPP TS38.212, section 7.3.1.1.

In one embodiment, the second signaling is DCI format 0_1, the specific meaning of the DCI format 0_1 can be found in 3GPP TS38.212, section 7.3.1.1.

In one embodiment, the second signaling is DCI format 0_2, the specific meaning of the DCI format 0_2 can be found in 3GPP TS38.212, section 7.3.1.1.

In one embodiment, the second signaling is a broadcast signaling.

In one embodiment, the second signaling is a multicast signaling.

In one embodiment, the second signaling is a groupcast signaling.

In one embodiment, the second signaling is a unicast signaling.

In one embodiment, the second signaling is a signaling for a single UE.

In one embodiment, the second signaling is a signaling for a plurality of UEs.

In one embodiment, the second signaling is a group common signaling.

In one embodiment, the second signal comprises a radio signal.

In one embodiment, the second signal comprises a radio-frequency signal.

In one embodiment, the second signal comprises a baseband signal.

In one embodiment, the second signal carries one or a plurality of TBs, or, the second signal carries semi-persistent CSI report or an aperiodic CSI report.

In one embodiment, the second signaling explicitly indicates the first-type radio resource pool used to transmit the second signal.

In one embodiment, the second signaling implicitly indicates the first-type radio resource pool used to transmit the second signal.

In one embodiment, the second signaling indicates time-domain resources occupied by the first-type radio resource pool used to transmit the second signal.

In one embodiment, the second signaling indicates frequency-domain resources occupied by the first-type radio resource pool used to transmit the second signal.

In one embodiment, at least one of the first radio resource pool or the second radio resource pool and the first-type radio resource pool used to transmit the second signal are overlapped in time domain, or, both the first radio resource pool and the second radio resource pool do not overlap with the first-type radio resource pool used to transmit the second signal in time domain.

In one embodiment, when any of the first radio resource pool or the second radio resource pool overlaps with the first-type radio resource pool used to transmit the second signal in time domain, the target radio resource pool is the first-type radio resource pool or another one of the first-type radio resource pool used to transmit the second signal.

In one embodiment, when any of the first radio resource pool or the second radio resource pool overlaps with the first-type radio resource pool used to transmit the second signal in time domain, the target radio resource pool is the first-type radio resource pool used to transmit the second signal.

In one embodiment, when the target radio resource pool in the present disclosure is the first-type radio resource pool used to transmit the second signal, the first signal and the second signal in the present disclosure are both transmitted in the target radio resource pool.

Embodiment 9

Embodiment 9 illustrates a schematic diagram for a target radio resource pool according to one embodiment of the present disclosure, as shown in FIG. 9.

In embodiment 9, when a first radio resource pool does not overlap with a first-type radio resource pool in time domain and a second radio resource pool overlaps with one of the first-type radio resource pool in time domain, or the first radio resource pool overlaps with one of the first-type radio resource pool in time domain and the second radio resource pool does not overlap with the first-type radio resource pool in time domain, and a target radio resource pool is one of the first-type radio resource pool.

In one embodiment, when the first radio resource pool and the first-type radio resource pool are non-overlapped in time domain and the second radio resource pool and one of the first-type radio resource pool are overlapped in time domain, the target radio resource pool is the one of the first-type radio resource pool being overlapped with the second radio resource pool in time domain.

In one embodiment, when the first radio resource pool and one of the first-type radio resource pool are overlapped in time domain and the second radio resource pool and the first-type radio resource pool are non-overlapped in time domain, the target radio resource pool is the one of the first-type radio resource pool being overlapped with the first radio resource pool in time domain.

In one embodiment, when the first radio resource pool and one of the first-type radio resource pool are overlapped in time domain as well as the second radio resource pool and one of the first-type radio resource pool are overlapped in time domain, the target radio resource pool is one of the first-type radio resource pool.

In one subembodiment of the above embodiment, the target radio resource pool is one of the first-type radio resource pool being overlapped with the first radio resource pool in time domain.

In one subembodiment of the above embodiment, the target radio resource pool is the one of first-type radio resource pool being overlapped with the second radio resource pool in time domain.

In one embodiment, when the second radio resource pool and one of the first-type radio resource pool are overlapped in time domain, the second radio resource pool and at most one of the first-type radio resource pool are overlapped in time domain.

In one embodiment, when the first radio resource pool and one of the first-type radio resource pool are overlapped in time domain, the first radio resource pool and at most one of the first-type radio resource pool are overlapped in time domain.

Embodiment 10

Embodiment 10 illustrates a flowchart of a processing performed by a first node on a second bit block according to one embodiment of the present disclosure, as shown in FIG. 10.

In Embodiment 10, the first node in the present disclosure receives a second bit block in step 1001;

In embodiment 10, the first signaling in the present disclosure comprises scheduling information of the second bit block, and the first bit block in the present disclosure indicates whether the second bit block is correctly received.

In one embodiment, the second bit block comprises at least one bit.

In one embodiment, the second bit block comprises a UL-SCH information bit.

In one embodiment, the second bit block carries a CSI report.

In one embodiment, the second bit block comprises a TB.

In one embodiment, the scheduling information comprises at least one of occupied time-domain resources, occupied frequency-domain resources, a Modulation and Coding Scheme (MCS), configuration information of DeModulation Reference Signals (DMRS), a Hybrid Automatic Repeat request (HARQ) process number, a Redundancy Version (RV), a New Data Indicator (NDI), a periodicity, a transmitting antenna port, or a corresponding Transmission Configuration Indicator (TCI) state.

In one embodiment, the second bit block is transmitted on a Physical Downlink Shared CHannel (PDSCH).

In one embodiment, one or a plurality of HARQ-ACK information bits comprised in the first bit block indicate whether the second bit block is correctly received.

Embodiment 11

Figure 11:
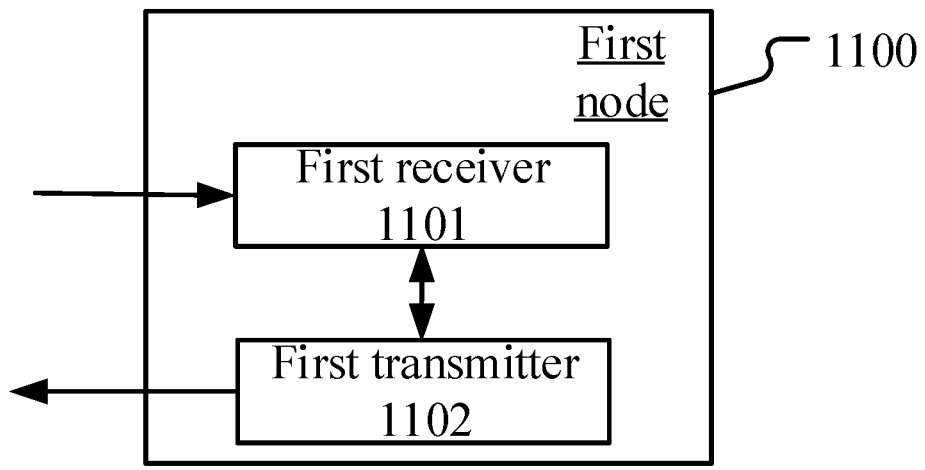
FIG. 11 illustrates a structure block diagram of a processing device in a first node according to one embodiment of the present disclosure.

Embodiment 11 illustrates a structure block diagram of a processing device in a first node, as shown in FIG. 11. In FIG. 11, a processing device 1100 in a first node comprises a first receiver 1101 and a first transmitter 1102.

In one embodiment, the first node 1100 is a UE.

In one embodiment, the first node 1100 is a relay node.

In one embodiment, the first node 1100 is a vehicle-mounted communication device.

In one embodiment, the first node 1100 is a UE supporting V2X communications.

In one embodiment, the first node 1100 is a relay node supporting V2X communications.

In one embodiment, the first receiver 1101 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1101 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1101 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1101 comprises at least the first three of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1101 comprises at least the first two of the antenna 452, the receiver 454, the multi-antenna receiving processor 458, the receiving processor 456, the controller/processor 459, the memory 460 and the data source 467 in FIG. 4 of the present disclosure.

In one embodiment, the first transmitter 1102 comprises at least one of the antenna 452, the transmitter 454, the multi-antenna transmitting processor 457, the transmitting processor 468, the controller/processor 459, the memory 460 or the data source 467 in FIG. 4 of the present disclosure.

In one embodiment, the first transmitter 1102 comprises at least first five the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1102 comprises at least first four the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1102 comprises at least first three the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1102 comprises at least first two the antenna 452, the transmitter 454, the multi-antenna transmitting processor 457, the transmitting processor 468, the controller/processor 459, the memory 460 and the data source 467 in FIG. 4 of the present disclosure.

In Embodiment 11, the first receiver 1101 receives a first signaling; the first transmitter 1102 transmits a first signal in a target radio resource pool, the first signal carries a first bit block; herein, the first bit block indicates a first state or a second state; the first signaling is used to determine at least one of a first radio resource pool or a second radio resource pool; the target radio resource pool is the first radio resource pool, the second radio resource pool or one of a first-type radio resource pool; when both the first radio resource pool and the second radio resource pool do not overlap with the first-type radio resource pool in time domain and the first bit block indicates the first state, the target radio resource pool is the first radio resource pool; when both the first radio resource pool and the second radio resource pool do not overlap with the first-type radio resource pool in time domain and the first bit block indicates the second state, the target radio resource pool is the second radio resource pool; when any of the first radio resource pool or the second radio resource pool overlaps with one of the first-type radio resource pool in time domain, the target radio resource pool is one of the first-type radio resource pool.

In one embodiment, the first radio resource pool and the second radio resource pool are both reserved for the first bit block and at most one of the first radio resource pool or the second radio resource pool is used to transmit the first bit block; and the first-type radio resource pool is a radio resource pool reserved for a bit block different from the first bit block.

In one embodiment, the first state and the second state are both states represented by HARQ-ACK information bit(s).

In one embodiment, the first receiver 1101 receives a second signaling; the first transmitter 1102 transmits a second signal; herein, the second signal is transmitted in one of the first-type radio resource pool, and the second signaling is used to indicate the first-type radio resource pool transmitting the second signal.

In one embodiment, when the first radio resource pool does not overlap with the first-type radio resource pool in time domain and the second radio resource pool overlaps with one of the first-type radio resource pool in time domain, or the first radio resource pool overlaps with one of the first-type radio resource pool in time domain and the second radio resource pool does not overlap with the first-type radio resource pool in time domain, whether the first bit block indicates the first state or the second state, the target radio resource pool is one of the first-type radio resource pool.

In one embodiment, the first receiver 1101 receives a second bit block; herein, the first signaling comprises scheduling information of the second bit block, and the first bit block indicates whether the second bit block is correctly received.

In one embodiment, the first radio resource pool and the second radio resource pool respectively belong to different cells.

In one embodiment, the first receiver 1101 receives a first signaling; the first transmitter 1102 transmits a first signal in a target radio resource pool, the first signal carries a first bit block; herein, the first bit block indicates a first state or a second state; the first signaling is used to determine at least one of a first radio resource pool or a second radio resource pool, the first radio resource pool comprises a PUCCH resource, and the second radio resource pool comprises another PUCCH resource; one of a first-type radio resource pool comprises radio resources occupied by a PUSCH; when both the first radio resource pool and the second radio resource pool do not overlap with the first-type radio resource pool in time domain and the first bit block indicates the first state, the target radio resource pool is the first radio resource pool, and the first signal is transmitted in the PUCCH resource in the first radio resource pool; when both the first radio resource pool and the second radio resource pool do not overlap with the first-type radio resource pool in time domain and the first bit block indicates the second state, the target radio resource pool is the second radio resource pool, and the first signal is transmitted in the another PUCCH resource in the second radio resource pool; when any of the first radio resource pool or the second radio resource pool overlaps with one of the first-type radio resource pool in time domain, the target radio resource pool is one of the first-type radio resource pool, and the first signal is transmitted in a PUSCH.

In one subembodiment of the above embodiment, when the first radio resource pool does not overlap with the first-type radio resource pool in time domain and the second radio resource pool overlaps with one of the first-type radio resource pool in time domain, or the first radio resource pool overlaps with one of the first-type radio resource pool in time domain and the second radio resource pool does not overlap with the first-type radio resource pool in time domain, whether the first bit block indicates the first state or the second state, the target radio resource pool is one of the first-type radio resource pool, and the first signal is transmitted in a PUSCH.

In one subembodiment of the above embodiment, the first bit block comprises a HARQ-ACK information bit, a HARQ-ACK information bit comprised in the first bit block indicates the first state or the second statue, and the first state and the second state are both states associated with a ACK or a NACK;

In one subembodiment of the above embodiment, the first bit block comprises a HARQ-ACK information bit, the first state is a ACK, and the second state is a NACK.

In one subembodiment of the above embodiment, the first bit block comprises an SR bit, the first state is a positive SR, and the first state is a negative SR.

In one subembodiment of the above embodiment, the PUCCH resource in the first radio resource pool and the another PUCCH resource in the second radio resource pool are reserved for the first bit block, and at most one of the PUCCH resource in the first radio resource pool or the another PUCCH resource in the second radio resource pool is used to transmit the first bit block.

Embodiment 12

Figure 12:
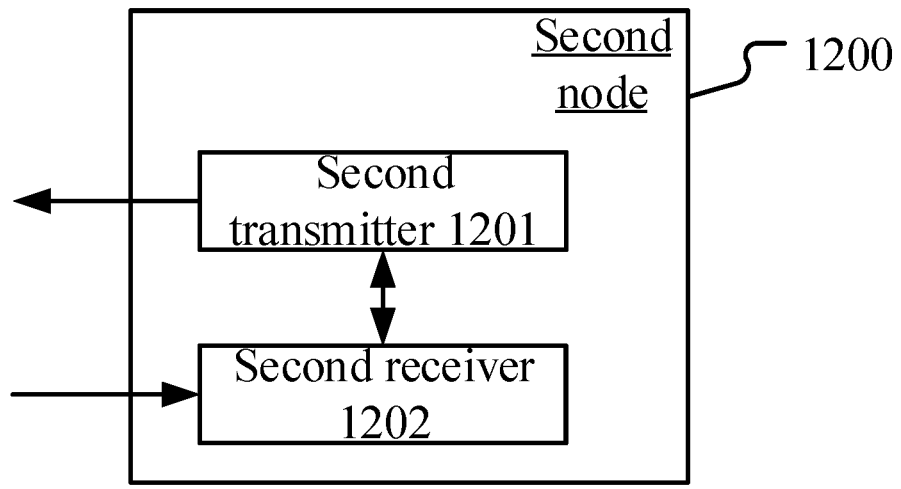
FIG. 12 illustrates a structure block diagram of a processing device in second node according to one embodiment of the present disclosure.

Embodiment 12 illustrates a structure block diagram of a processing device in a second node, as shown in FIG. 12. In FIG. 12, a processing device 1200 in a second node comprises a second transmitter 1201 and a second receiver 1202.

In one embodiment, the second node 1200 is a UE.

In one embodiment, the second node 1200 is a base station.

In one embodiment, the second node 1200 is a relay node.

In one embodiment, the second node 1200 is a vehicle-mounted communication device.

In one embodiment, the second node 1200 is a UE supporting V2X communications.

In one embodiment, the second transmitter 1201 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1201 comprises at least the first five of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1201 comprises at least the first four of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1201 comprises at least the first three of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1201 comprises at least the first two of the antenna 420, the transmitter 418, the multi-antenna transmitting processor 471, the transmitting processor 416, the controller/processor 475 and the memory 476 in FIG. 4 of the present disclosure.

In one embodiment, the second receiver 1202 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1202 comprises at least first five of the antenna 420, the receiver 418, the multi-antenna receiving processor 472, the receiving processor 470, the controller/processor 475 and the memory 476 in FIG. 4 of the present disclosure.

In one embodiment, the second receiver 1202 comprises at least first four of the antenna 420, the receiver 418, the multi-antenna receiving processor 472, the receiving processor 470, the controller/processor 475 and the memory 476 in FIG. 4 of the present disclosure.

In one embodiment, the second receiver 1202 comprises at least first three of the antenna 420, the receiver 418, the multi-antenna receiving processor 472, the receiving processor 470, the controller/processor 475 and the memory 476 in FIG. 4 of the present disclosure.

In one embodiment, the second receiver 1202 comprises at least first two of the antenna 420, the receiver 418, the multi-antenna receiving processor 472, the receiving processor 470, the controller/processor 475 and the memory 476 in FIG. 4 of the present disclosure.

In Embodiment 12, the second transmitter 1201 transmits a first signaling; the second receiver receives a first signal in a target radio resource pool, the first signal carries a first bit block; herein, the first bit block indicates a first state or a second state; the first signaling is used to determine at least one of a first radio resource pool or a second radio resource pool; the target radio resource pool is the first radio resource pool, the second radio resource pool or one of a first-type radio resource pool; when both the first radio resource pool and the second radio resource pool do not overlap with the first-type radio resource pool in time domain, the target radio resource pool is the first radio resource pool or the second radio resource pool; when any of the first radio resource pool or the second radio resource pool overlaps with one of the first-type radio resource pool in time domain, the target radio resource pool is one of the first-type radio resource pool.

In one embodiment, the first radio resource pool and the second radio resource pool are both reserved for the first bit block and at most one of the first radio resource pool or the second radio resource pool is used to transmit the first bit block; and the first-type radio resource pool is a radio resource pool reserved for a bit block different from the first bit block.

In one embodiment, the first state and the second state are both states represented by HARQ-ACK information bit(s).

In one embodiment, the second transmitter 1201 transmits a second signaling; the second receiver 1202 receives a second signal; herein, the second signal is transmitted in one of the first-type radio resource pool, and the second signaling is used to indicate the first-type radio resource pool transmitting the second signal.

In one embodiment, when the first radio resource pool does not overlap with the first-type radio resource pool in time domain and the second radio resource pool overlaps with one of the first-type radio resource pool in time domain, or the first radio resource pool overlaps with one of the first-type radio resource pool in time domain and the second radio resource pool does not overlap with the first-type radio resource pool in time domain, whether the first bit block indicates the first state or the second state, the target radio resource pool is one of the first-type radio resource pool.

In one embodiment, the second transmitter 1201 transmits a second bit block; herein, the first signaling comprises scheduling information of the second bit block, and the first bit block indicates whether the second bit block is correctly received.

In one embodiment, the first radio resource pool and the second radio resource pool respectively belong to different cells.

In one embodiment, the second transmitter 1201 transmits a first signaling; the second receiver 1202 monitors a signal in at least one of a first radio resource pool, a second radio resource pool or one of a first-type radio resource pool; herein, the first signaling is used to determine at least one of a first radio resource pool or a second radio resource pool.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations, test device, test equipment, test instrument and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
    a first receiver, receiving a first signaling; and
    a first transmitter, transmitting a first signal in a target radio resource pool, the first signal carrying a first bit block;
    wherein the first bit block indicates a first state or a second state; the first signaling is used to determine at least one of a first radio resource pool or a second radio resource pool;
        the target radio resource pool is the first radio resource pool, the second radio resource pool or one of a first-type radio resource pool; when both the first radio resource pool and the second radio resource pool do not overlap with the first-type radio resource pool in time domain and the first bit block indicates the first state, the target radio resource pool is the first radio resource pool; when both the first radio resource pool and the second radio resource pool do not overlap with the first-type radio resource pool in time domain and the first bit block indicates the second state, the target radio resource pool is the second radio resource pool; when any of the first radio resource pool or the second radio resource pool overlaps with one of the first-type radio resource pool in time domain, the target radio resource pool is one of the first-type radio resource pool.

2. The first node according to claim 1, wherein the first radio resource pool and the second radio resource pool are both reserved for the first bit block and at most one of the first radio resource pool or the second radio resource pool is used to transmit the first bit block; and the first-type radio resource pool is a radio resource pool reserved for a bit block different from the first bit block.

3. The first node according to claim 1, wherein the first state and the second state are both states represented by Hybrid Automatic Repeat reQuest Acknowledgement (HARQ-ACK) information bit(s).

4. The first node according to claim 3, wherein the first radio resource pool and the second radio resource pool respectively comprise two Physical Uplink Control Channel (PUCCH) resources, and the first-type radio resource pool is radio resources occupied by a Physical Uplink Shared Channel (PUSCH).

5. The first node according to claim 4, wherein when the first radio resource pool does not overlap with the first-type radio resource pool in time domain and the second radio resource pool overlaps with one of the first-type radio resource pool in time domain, or the first radio resource pool overlaps with one of the first-type radio resource pool in time domain and the second radio resource pool does not overlap with the first-type radio resource pool in time domain, whether the first bit block indicates the first state or the second state, the target radio resource pool is one of the first-type radio resource pool.

6. The first node according to claim 4, wherein the first radio resource pool and the second radio resource pool are non-overlapped in time domain.

7. The first node according to claim 1, wherein the first radio resource pool and the second radio resource pool respectively belong to different cells.

8. A second node for wireless communications, comprising:
    a second transmitter, transmitting a first signaling; and a second receiver, receiving a first signal in a target radio resource pool, the first signal carrying a first bit block;

wherein the first bit block indicates a first state or a second state; the first signaling is used to determine at least one of a first radio resource pool or a second radio resource pool;

the target radio resource pool is the first radio resource pool, the second radio resource pool or one of a first-type radio resource pool; when both the first radio resource pool and the second radio resource pool do not overlap with the first-type radio resource pool in time domain, the target radio resource pool is the first radio resource pool or the second radio resource pool; when any of the first radio resource pool or the second radio resource pool overlaps with one of the first-type radio resource pool in time domain, the target radio resource pool is one of the first-type radio resource pool.

9. The second node according to claim 8, wherein the first radio resource pool and the second radio resource pool are both reserved for the first bit block and at most one of the first radio resource pool or the second radio resource pool is used to transmit the first bit block; and the first-type radio resource pool is a radio resource pool reserved for a bit block different from the first bit block.

10. The second node according to claim 8, wherein the first state and the second state are both states represented by Hybrid Automatic Repeat reQuest Acknowledgement (HARQ-ACK) information bit(s).

11. The second node according to claim 10, wherein the first radio resource pool and the second radio resource pool respectively comprise two Physical Uplink Control Channel (PUCCH) resources, and the first-type radio resource pool is radio resources occupied by a Physical Uplink Shared Channel (PUSCH).

12. The second node according to claim 11, wherein the first radio resource pool and the second radio resource pool are non-overlapped in time domain.

13. A method in a first node for wireless communications, comprising:

receiving a first signaling; and transmitting a first signal in a target radio resource pool, the first signal carrying a first bit block;

wherein the first bit block indicates a first state or a second state; the first signaling is used to determine at least one of a first radio resource pool or a second radio resource pool;

the target radio resource pool is the first radio resource pool, the second radio resource pool or one of a first-type radio resource pool; when both the first radio resource pool and the second radio resource pool do not overlap with the first-type radio resource pool in time domain and the first bit block indicates the first state, the target radio resource pool is the first radio resource pool; when both the first radio resource pool and the second radio resource pool do not overlap with the first-type radio resource pool in time domain and the first bit block indicates the second state, the target radio resource pool is the second radio resource pool; when any of the first radio resource pool or the second radio resource pool overlaps with one of the first-type radio resource pool in time domain, the target radio resource pool is one of the first-type radio resource pool.

14. The method in the first node according to claim 13, wherein the first radio resource pool and the second radio resource pool are both reserved for the first bit block and at most one of the first radio resource pool or the second radio resource pool is used to transmit the first bit block; and the first-type radio resource pool is a radio resource pool reserved for a bit block different from the first bit block.

15. The method in the first node according to claim 13, wherein the first state and the second state are both states represented by Hybrid Automatic Repeat reQuest Acknowledgement (HARQ-ACK) information bit(s).

16. The method in the first node according to claim 15, wherein the first radio resource pool and the second radio resource pool respectively comprise two Physical Uplink Control Channel (PUCCH) resources, and the first-type radio resource pool is radio resources occupied by a Physical Uplink Shared Channel (PUSCH).

17. The method in the first node according to claim 16, wherein when the first radio resource pool does not overlap with the first-type radio resource pool in time domain and the second radio resource pool overlaps with one of the first-type radio resource pool in time domain, or the first radio resource pool overlaps with one of the first-type radio resource pool in time domain and the second radio resource pool does not overlap with the first-type radio resource pool in time domain, whether the first bit block indicates the first state or the second state, the target radio resource pool is one of the first-type radio resource pool.

18. The method in the first node according to claim 16, wherein the first radio resource pool and the second radio resource pool are non-overlapped in time domain.

19. The method in the first node according to claim 13, wherein the first radio resource pool and the second radio resource pool respectively belong to different cells.

20. A method in a second node for wireless communications, comprising:

transmitting a first signaling; and receiving a first signal in a target radio resource pool, the first signal carrying a first bit block;

wherein the first bit block indicates a first state or a second state; the first signaling is used to determine at least one of a first radio resource pool or a second radio resource pool;

the target radio resource pool is the first radio resource pool, the second radio resource pool or one of a first-type radio resource pool; when both the first radio resource pool and the second radio resource pool do not overlap with the first-type radio resource pool in time domain, the target radio resource pool is the first radio resource pool or the second radio resource pool; when any of the first radio resource pool or the second radio resource pool overlaps with one of the first-type radio resource pool in time domain, the target radio resource pool is one of the first-type radio resource pool.

\* \* \* \* \*